(12) United States Patent  
Kudo

(10) Patent No.: US 8,397,046 B2  
(45) Date of Patent: Mar. 12, 2013

(54) METHOD AND APPARATUS FOR DEPLOYING VIRTUAL HARD DISK TO STORAGE SYSTEM

(75) Inventor: Yutaka Kudo, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 747 days.

(21) Appl. No.: 12/411,805

(22) Filed: Mar. 26, 2009

(65) Prior Publication Data

US 2010/0250630 A1     Sep. 30, 2010

(51) Int. Cl.  
*G06F 12/00*     (2006.01)

(52) U.S. Cl. ........ 711/170; 711/114; 711/203; 711/202; 711/E12.002; 707/821; 707/609; 707/E17.014; 707/E17.005

(58) Field of Classification Search .................. 711/114, 711/112, 6, 170, E12.002, E12.017; 707/205, 707/206, 3, E17.01, E17.014, E17.005, E17.006, 707/821, 609; 718/1

See application file for complete search history.

(56) References Cited

U.S. PATENT DOCUMENTS

| | | | |
|---|---|---|---|
| 6,401,181 B1 * | 6/2002 | Franaszek et al. ............ | 711/170 |
| 7,130,960 B1 | 10/2006 | Kano | |
| 7,873,600 B2 * | 1/2011 | Murayama et al. ........... | 707/640 |
| 7,917,722 B2 * | 3/2011 | Yamamoto et al. ........... | 711/171 |
| 2004/0044851 A1 * | 3/2004 | Dawson et al. ............... | 711/111 |
| 2006/0168365 A1 * | 7/2006 | Martinez et al. ............. | 711/206 |
| 2009/0248763 A1 * | 10/2009 | Rajan et al. ................... | 711/170 |
| 2010/0049750 A1 * | 2/2010 | Srivastava et al. ............ | 707/202 |
| 2010/0070725 A1 * | 3/2010 | Prahlad et al. ................ | 711/162 |
| 2010/0082934 A1 * | 4/2010 | Naganuma et al. ........... | 711/170 |
| 2010/0088485 A1 * | 4/2010 | Ikeda et al. ................... | 711/170 |
| 2010/0153617 A1 * | 6/2010 | Miroshnichenko et al. .. | 711/170 |
| 2010/0250880 A1 * | 9/2010 | Mimatsu ....................... | 711/170 |
| 2011/0167294 A1 * | 7/2011 | Ninose et al. ................ | 714/6.22 |
| 2011/0208940 A1 * | 8/2011 | Naganuma et al. ........... | 711/170 |

FOREIGN PATENT DOCUMENTS

EP     002037363 A2 *   3/2009

OTHER PUBLICATIONS

Distributed Management Task Force, Inc. (DMTF), "Open Virtualization Format Specification", Feb. 22, 2009.

* cited by examiner

*Primary Examiner* — Pierre-Michel Bataille  
(74) *Attorney, Agent, or Firm* — Mattingly & Malur, P.C.

(57) ABSTRACT

Exemplary embodiments of the invention provide a solution to deploy a virtual hard disk (VHD) to virtual device with maximizing capacity efficiency and data access performance by making the allocation unit size of virtual device the same as that of the VHD. In one embodiment, a method of deploying a VHD file to a storage apparatus comprises checking a block size of the VHD file received by the storage apparatus based on a header of the VHD file; creating a virtual volume to provide a page size which is same size as the block size of the VHD file; and performing one of (A) copying contents of the VHD file to the created virtual volume by allocating one page of the created virtual volume for each block of the VHD file; or (B) formatting the created virtual volume with a virtual volume file system, and copying the VHD file to the formatted virtual volume.

20 Claims, 23 Drawing Sheets

Overview of Virtual to Physical migration of a server computer

Functional Relationships in the Information System

| NAME | VALUE |
|---|---|
| CPU | 2 |
| Memory | 1024 byte |
| HDD | VirtualDisk.vhd |
| NIC | 2 |
| CD-ROM | 1 |
| ... | ... |

VM Spec File 112

FIG. 4

| | 501 | 502 | 503 | 504 | 505 | 506 | 507 | |
|---|---|---|---|---|---|---|---|---|
| | Host ID | Status | Type | CPUs | Memory | NIC | CD-ROM | ... |
| 511 | HOST-001 | Allocated | Physical Server | 2 | 4G | 2 | 1 | ... |
| 512 | HOST-002 | Free | Physical Server | 2 | 4G | 2 | 1 | ... |
| 513 | HOST-003 | Free | Physical Server | 4 | 4G | 3 | 1 | ... |
| 514 | HOST-004 | Allocated | Physical Server | 4 | 4G | 4 | 1 | ... |
| 515 | HOST-005 | Allocated | Logical Partition | 2 | 4G | 2 | 1 | ... |
| 516 | HOST-006 | Allocated | Logical Partition | 2 | 4G | 1 | 1 | ... |
| 517 | POOL | - | Logical Partition | 16 | 32G | Any | Any | ... |

Host TBL 114

FIG. 5

| Array Group | Size | RAID Type | LDEV ID | Start LBA | End LBA | Use |
|---|---|---|---|---|---|---|
| AG-001 | 4TB | RAID6 | LDEV-101 | 0 | 1073741823 | DEDICATED |
| | | | LDEV-102 | 1073741824 | 2147483647 | DEDICATED |
| | | | ... | ... | ... | ... |
| AG-002 | 8TB | RAID5 | LDEV-201 | 2048 | 2147483647 | FOR PAGE |
| | | | ... | ... | ... | ... |
| AG-003 | 8TB | RAID5 | LDEV-301 | 0 | 2147483647 | FOR PAGE |
| | | | ... | ... | ... | ... |
| ... | ... | ... | ... | ... | ... | ... |

LDEV Management TBL 261

FIG. 6

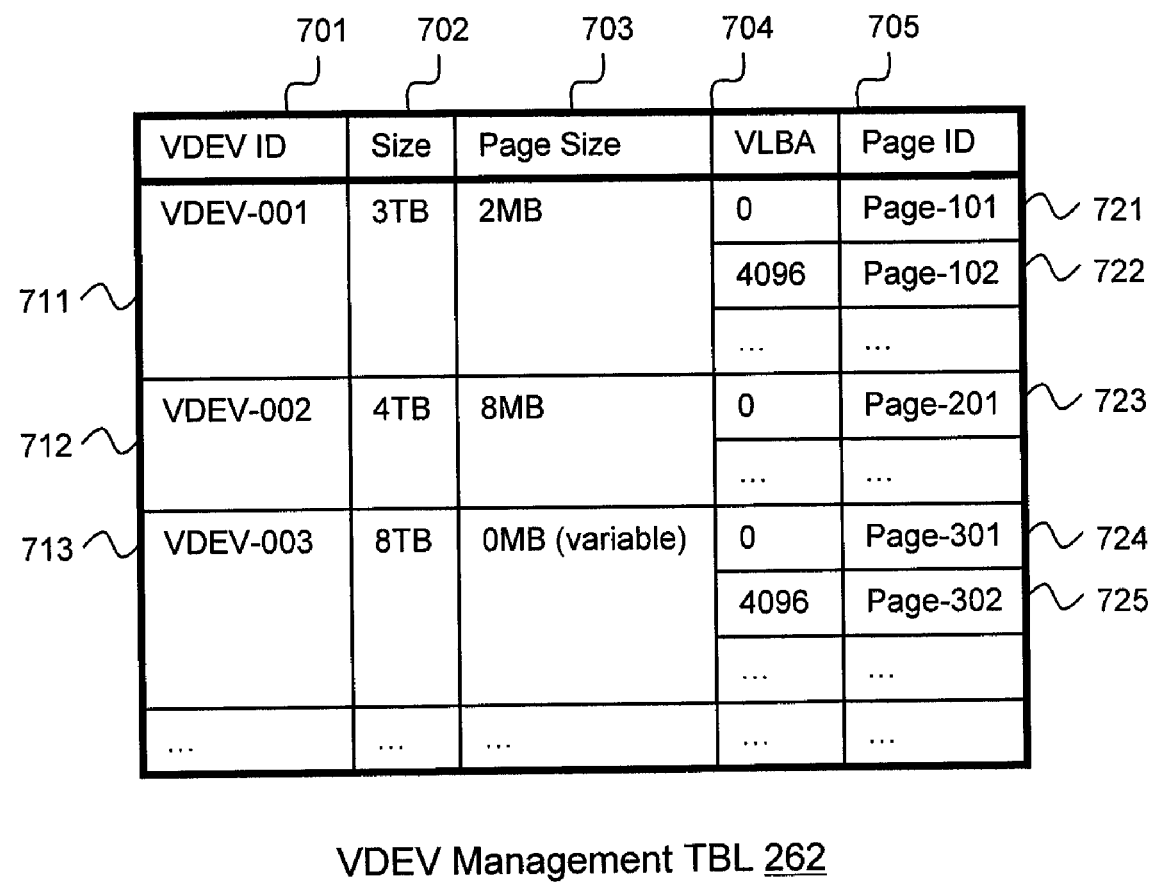

| VDEV ID | Size | Page Size | VLBA | Page ID |
|---|---|---|---|---|
| VDEV-001 | 3TB | 2MB | 0 | Page-101 |
| | | | 4096 | Page-102 |
| | | | ... | ... |
| VDEV-002 | 4TB | 8MB | 0 | Page-201 |
| | | | ... | ... |
| VDEV-003 | 8TB | 0MB (variable) | 0 | Page-301 |
| | | | 4096 | Page-302 |
| | | | ... | ... |
| ... | ... | ... | ... | ... |

VDEV Management TBL 262

FIG. 7

| | 801 | 802 | 803 | 804 |
|---|---|---|---|---|
| | Page ID | LDEV | LBA | Page Size |
| 811 | Page-001 | LDEV-201 | 0 | 2MB |
| 812 | Page-002 | LDEV-201 | 4096 | 2MB |
| | ... | ... | ... | ... |
| 813 | Page-201 | LDEV-201 | 123821 | 8MB |
| | ... | ... | ... | ... |
| 814 | Page-301 | LDEV-301 | 0 | 8MB |
| 815 | Page-302 | LDEV-301 | 16384 | 2MB |
| | ... | ... | ... | ... |

Page Management TBL 263

FIG. 8

| | 901 | 902 | 903 | 904 |
|---|---|---|---|---|
| | LU ID | Type | Volume ID | VHD ID |
| 911 | LU-001 | LDEV | LDEV-001 | - |
| 912 | LU-002 | VDEV | VDEV-001 | - |
| 913 | LU-003 | VDEV | VDEV-003 | VHD-001.vhd |
| 914 | LU-004 | LDEV | LDEV-004 | - |
| 915 | LU-005 | VHD | VDEV-005 | VHD-002.vhd |
| | ... | | ... | ... |

LU-VOLUME-VHD Mapping TBL 264

FIG. 9

METHOD AND APPARATUS FOR DEPLOYING VIRTUAL HARD DISK TO STORAGE SYSTEM

BACKGROUND OF THE INVENTION

The present invention relates generally to a storage system for managing storage apparatuses and, more particularly, to a method and a system for deploying a virtual hard disk file to a virtual volume known as thin provisioning.

The use of virtual hard disk (VHD) has been widespread in accordance with the growth of server virtualization technology. In addition, the virtual appliance which packs virtual server specification and the VHD into one package has also grown in usage. The VHD can be recognized as a logical volume by the virtual machine even though the VHD is recognized as just a file by the physical server because the hypervisor converts the VHD file dynamically and presents it as a volume to the virtual machine. The VHD has a thin provisioning functionality that grows its actual capacity on demand. On the other hand, the thin provisioning functionality has also been implemented in a storage apparatus such as the Hitachi Dynamic Provisioning of Hitachi USP/V. In that case, the virtual volume is presented as a logical unit that can be accessed through a fiber channel mainly from the physical server.

Migration between the virtual server and physical server is increasingly popular based on the requirement for performance and availability of the application system. However, the physical server cannot access the VHD as a logical drive. Conversion of the VHD to a logical device is necessary for the use of the VHD by the physical server. In that case, if the VHD is converted to a fixed-size logical device, it creates a problem that the capacity efficiency decreases. Furthermore, in the case where the VHD is converted to a virtual device (logical device with thin provisioning), if there is a gap between the page size of the virtual device and the block size of the VHD, the capacity efficiency is not fully realized.

BRIEF SUMMARY OF THE INVENTION

Exemplary embodiments of the invention provide a solution to deploy a VHD to virtual device with maximizing capacity efficiency and data access performance by making the allocation unit size of virtual device the same as that of the VHD. There are two ways to store a VHD to a virtual volume. One is converting the VHD to the virtual volume, and the other is storing the VHD as a file on the virtual volume created using VHD characteristics (block size). This invention covers both cases. A stand alone storage apparatus can expose the data access interface of the VHD to the host computer.

In accordance with an aspect of the present invention, a method of deploying a VHD file to a storage apparatus comprises checking a block size of the VHD file received by the storage apparatus based on a header of the VHD file; creating a virtual volume to provide a page size which is same size as the block size of the VHD file; and performing one of (A) copying contents of the VHD file to the created virtual volume by allocating one page of the created virtual volume for each block of the VHD file; or (B) formatting the created virtual volume with a virtual volume file system, and copying the VHD file to the formatted virtual volume.

In some embodiments, the created virtual volume and the VHD file have the same capacity. The method further comprises providing a LU-volume-VHD mapping table in the storage apparatus (LU stands for logical unit). The LU-volume-VHD mapping table contains mapping information for at least one of mapping one or more virtual volumes in the storage apparatus each to a logical unit presented by the storage apparatus to a host computer so as to accept access from the host computer to the virtual volume, or mapping one or more logical devices in the storage apparatus each to a logical unit presented by the storage apparatus to a host computer so as to accept access from the host computer to the logical device. The method further comprises assigning a logical unit ID (ID stands for identification) of the logical unit corresponding to the virtual volume and adding one entry of record into a LU-volume-VHD mapping table which contains mapping information for mapping the virtual volume to the logical unit presented by the storage apparatus to the host computer so as to accept access from the host computer to the virtual volume. The entry of record includes the logical unit ID, a VHD ID of the VHD file, and a volume ID identifying the virtual volume in the storage apparatus.

In specific embodiments, (B) is performed to copy the VHD file to the formatted virtual volume, and the method further comprises receiving a data write command to write data to a logical unit corresponding to the VHD file copied to the formatted virtual volume; and providing a dynamic conversion between the VHD file and the logical unit, on an on-demand basis, by allocating one or more pages in the formatted virtual volume for writing data from the write command on an on-demand basis.

In accordance with another aspect of the invention, a system of deploying a VHD file to a storage apparatus comprises a storage apparatus; a host computer; and a network connecting the storage apparatus and the host computer. The storage apparatus receives a VHD file and checks a block size of the VHD file based on a header of the VHD file; creates a virtual volume to provide a page size which is same size as the block size of the VHD file; and performs one of (A) copying contents of the VHD file to the created virtual volume by allocating one page of the created virtual volume for each block of the VHD file; or (B) formatting the created virtual volume with a virtual volume file system, and copying the VHD file to the formatted virtual volume.

In some embodiments, a management computer is connected to the network. The storage apparatus includes a VHD management module which receives the VHD file from the management computer, creates the virtual volume, and sends back to the management computer an ID of a logical unit in the storage apparatus corresponding to the VHD file. The logical unit is presented by the storage apparatus to the host computer so as to accept access from the host computer to the virtual volume.

In specific embodiments, the storage apparatus performs (A) to copy contents of the VHD file to the virtual volume. The storage apparatus includes a volume controller and a VHD-block converter which reads a VHD size and a block size of the VHD file from the header of the VHD file, and invokes the volume controller to create the virtual volume to provide a page size which is the same size as the block size of the VHD file and a virtual volume size which is same size as the VHD size of the VHD file. The VHD-block converter assigns a logical unit ID of a logical unit to the virtual volume and adds one entry of record into a LU-volume-VHD mapping table which contains mapping information for mapping the virtual volume to the logical unit presented by the storage apparatus to the host computer so as to accept access from the host computer to the virtual volume. The entry of record includes the logical unit ID, a VHD ID of the VHD file, and a volume ID identifying the virtual volume in the storage apparatus.

In specific embodiments, the storage apparatus performs (B) to copy the VHD file to the formatted virtual volume; and includes a volume controller and a VHD deployment module which receives the VHD file, obtains a VHD size and the block size of the VHD file, and invokes the volume controller to create the virtual volume to provide a page size which is the same size as the block size of the VHD file and a virtual volume size which is same size as the VHD size of the VHD file. The storage apparatus includes a file system which formats the virtual volume. The VHD deployment module writes the header and all data blocks of the VHD file to the formatted virtual volume, and assigns a logical unit ID of a logical unit to the virtual volume and adding one entry of record into a LU-volume-VHD mapping table which contains mapping information for mapping the virtual volume to the logical unit presented by the storage apparatus to the host computer so as to accept access from the host computer to the virtual volume. The entry of record includes the logical unit ID, a VHD ID of the VHD file, and a volume ID identifying the virtual volume in the storage apparatus. The storage apparatus includes a block-VHD converter which receives a read command from the host computer, the read command including a target logical unit ID, a target LBA, and a size. If the target logical unit ID in the LU-volume-VHD mapping table indicates a VHD file to be read, the block-VHD converter obtains a volume ID of the virtual volume corresponding to the target logical unit ID and a VHD ID corresponding to the volume ID, gets a start VLBA of the VHD file specified by the VHD ID and volume ID, calculates a VLBA by using the target LBA and the start VLBA, and reads data from the calculated VLBA.

Another aspect of the invention is directed to a computer-readable storage medium storing a plurality of instructions for controlling a data processor to deploy a VHD file to a storage apparatus. The plurality of instructions comprise instructions that cause the data processor to check a block size of the VHD file received by the storage apparatus based on a header of the VHD file; instructions that cause the data processor to create a virtual volume to provide a page size which is same size as the block size of the VHD file; and instructions that cause the data processor to perform one of (A) copying contents of the VHD file to the created virtual volume by allocating one page of the created virtual volume for each block of the VHD file; or (B) formatting the created virtual volume with a virtual volume file system, and copying the VHD file to the formatted virtual volume.

These and other features and advantages of the present invention will become apparent to those of ordinary skill in the art in view of the following detailed description of the specific embodiments.

BRIEF DESCRIPTION OF THE DRAWINGS

FIG. 4 shows an example of a VM Spec File.

FIG. 5 shows an example of a Host Table.

FIG. 6 shows an example of an LDEV Management Table.

FIG. 7 shows an example of a VDEV Management Table.

FIG. 8 shows an example of a Page Management Table.

FIG. 9 shows an example of a LU-Volume-VHD Mapping Table.

DETAILED DESCRIPTION OF THE INVENTION

Figure 1:
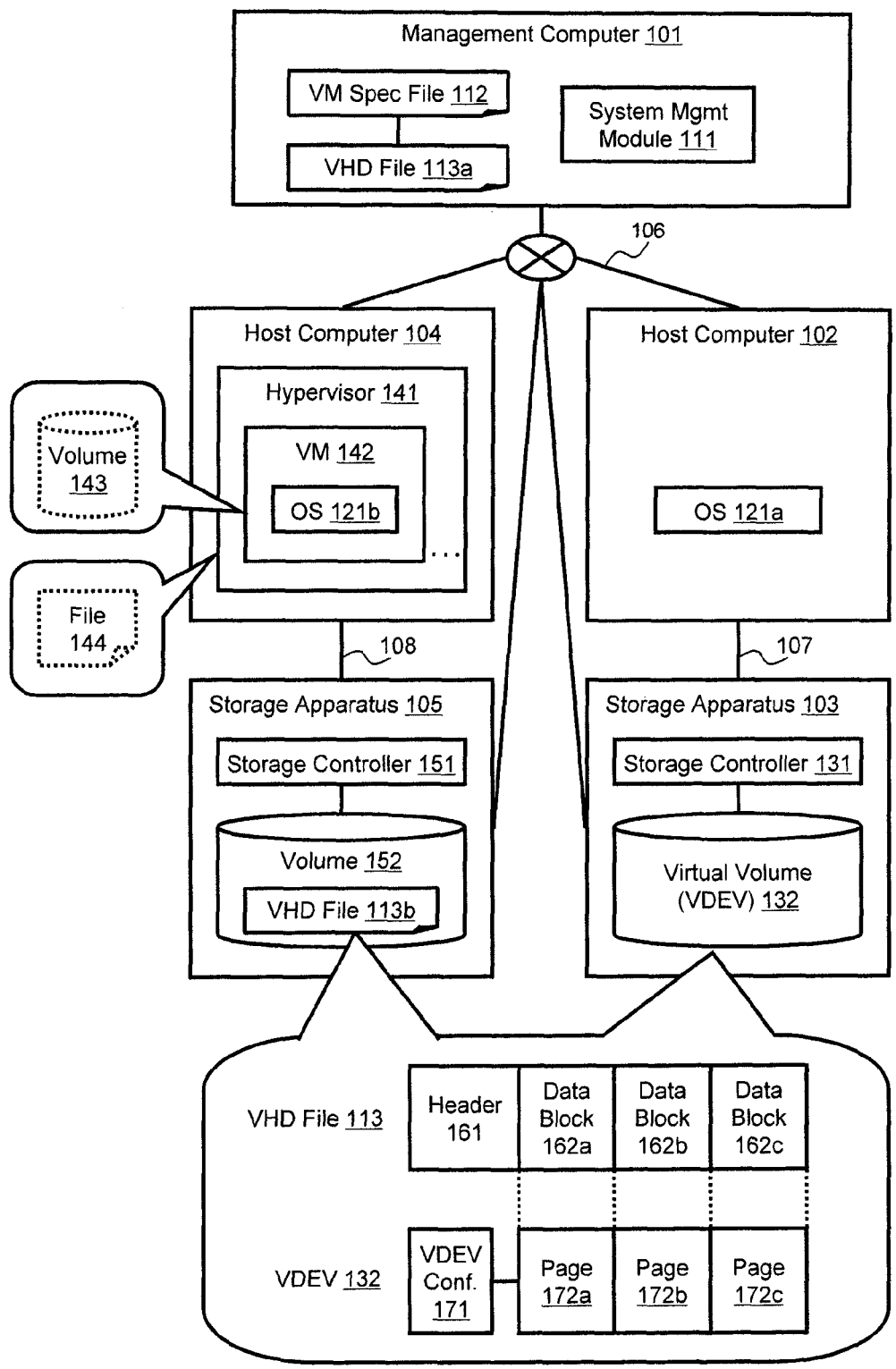
FIG. 1 shows an overview of the virtual to physical migration of a server computer according to a first embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for deploying a virtual hard disk file to a virtual volume.

First Embodiment

FIG. 1 shows an overview of the virtual to physical migration of a server computer according to a first embodiment of the invention. A management computer 101, a first host computer 102, a second host computer 104, a first storage apparatus 103, and a second storage apparatus 105 are connected through a management LAN 106. The first host computer 102 and the associated first storage apparatus 103 are connected through a first SAN 107. The second host computer 104 and the second storage apparatus 105 are connected through a second SAN 108. The management computer 101 has a VM Spec File 112, a VHD File 113a, and a system management module 111.

The second host computer 104 runs a virtual machine 142. It can be a generic computer. A hypervisor 141 runs on the second host computer 104. The virtual machine 142 runs on the hypervisor 141. An operating system 121b runs on the virtual machine 142. The hypervisor 141 recognizes a VHD File 113b in the second storage apparatus 105 as a file (namely, a file 144), but the VHD File 113b is recognized as a volume (namely, a volume 143) by the virtual machine 142, because a function in the hypervisor 141 converts the VHD File 113b into the volume 143 dynamically. The second storage apparatus 105 that is connected to and associated with the second host computer 104 that runs the virtual machine 142 has a second storage controller 151 and a volume 152. The VHD File 113b is stored in the volume 152 and provided to the second host computer 104 through the second SAN 108 by the second storage controller 151.

The first host computer 102 runs the operating system physically. It can be a generic computer. An operating system 121a runs on the first host computer 102. The first storage apparatus (OS) 103 is connected to and associated with the first host computer 102 which runs the OS 121a physically. The first storage apparatus 103 has a first storage controller 131 and a VDEV (virtual volume) 132. The VDEV 132 is realized by the first storage controller 131. The VDEV 132 is provided to the first host computer 102 as a logical volume through the first SAN 107 by the first storage controller 131.

In general, there can be six types of migration, including image to virtual, virtual to image, image to physical, physical to image, virtual to physical, and physical to virtual. This embodiment covers image to physical migration and virtual to physical migration.

In a conventional way, the VHD File 113 will be stored in the volume 152 of the second storage apparatus 105 as a file. The VHD File 113 has a mechanism of thin provisioning where the file size will be expanded in an on-demand basis. However, the size of the volume 152 storing the VHD File 113 is fixed (predetermined) if the volume 152 is provided as a normal logical device (LDEV). Thus some capacity typically will remain unused. The VDEV 132 of the first storage apparatus 103 also has a mechanism of thin provisioning. Thus, storing the VHD File 113 in the VDEV 132 allows the system to avoid having the unused capacity. In addition, the unit size of expansion (allocation page size) is determined for the application stored in the VHD File 113 based on the performance or capacity estimation, so that the unit size of expansion of the VDEV 132 should be the same as that of the VHD File 113. By doing this, the behavior (performance or capacity) can be under the estimation of the application developer.

Figure 2:
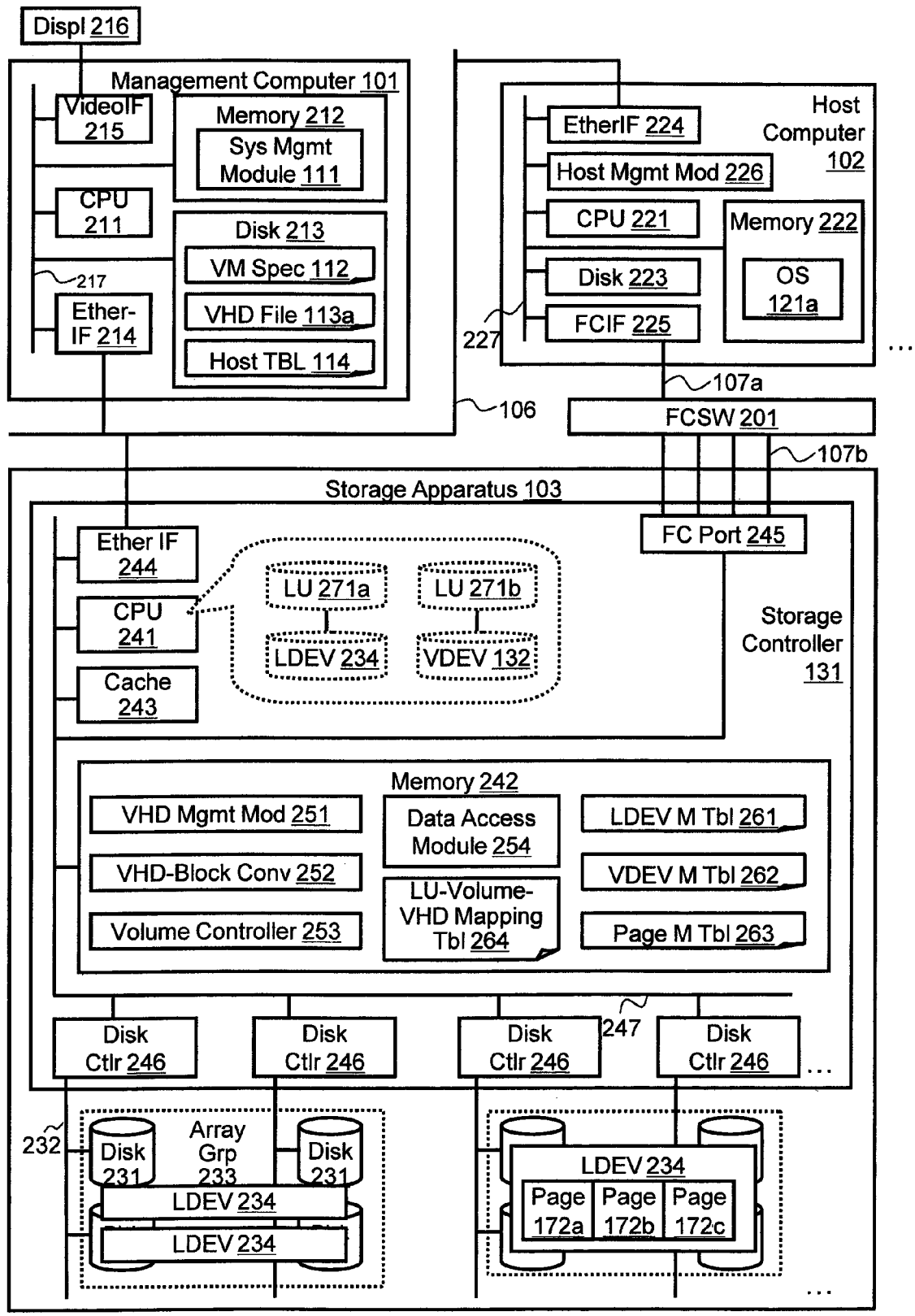
FIG. 2 illustrates an example of a hardware and logical configuration of the storage system in which the method and apparatus of the invention may be applied.

FIG. 2 illustrates an example of a hardware and logical configuration of the storage system in which the method and apparatus of the invention may be applied. The hardware architecture, software modules, and tables of the storage system are shown. The management computer 101, first host computer 102, and first storage apparatus 103 are connected through the management LAN 106. For convenience, the first host computer 102 will be referred to as simply the host computer 102 and the first storage apparatus 103 will be referred to as simply the storage apparatus herein below. The host computer 102, fiber channel switch 201, and storage apparatus 103 are connected through fiber cables 107a, 107b.

The management computer 101 may be a generic computer that includes a CPU 211, a memory 212, an Ethernet interface 214, a disk 213, and a video interface 215. Each element is connected through the system bus 217. The management computer 101 has a system management module 111 in its memory 212 that is executed by the CPU 211. The management computer 101 has a VM Spec File 112, a VHD File 113a, and a Host Table 114 in its disk 213 that are used by the system management module 111. The management computer 101 has the Ethernet interface (network interface card) 214 that is connected to the management LAN 106 and used to send or receive command packet to or from the storage apparatus 103 and host computer 102. The display 216 is connected to the video interface 215 and used to display the results of processes executed by the system management module 111.

The host computer 102 may be a generic computer that includes a CPU 221, a memory 222, an Ethernet interface 224, a fiber channel interface 225, a disk 223, and a host management module 226. Each element is connected through the system bus 227. An operating system 121a will run on the host computer 102 after the migration process is executed by the system management module 111. The host computer 102 has the fiber channel interface 225 that is connected to the fiber channel switch 201 by a fiber cable 107a and used to send or receive data to or from the storage apparatus 103.

The storage apparatus 103 includes the storage controller 131 and disks 231. The storage controller 131 includes a fiber channel port 245, a CPU 241, a cache 243, a memory 242, and disk controllers 246. Each element is connected through the system bus 247. The storage controller 131 has a VHD management module 251, a VHD-block converter 252, a volume controller 253, and a data access module 254 in its memory 242, and they are executed by the CPU 241. The storage controller 131 has an LDEV Management Table 261 in its memory 242 that is used to manage the relationship between the array group 223 and LDEV 234, and also the capacity, start LBA (logical block address), end LBA, and usage of the LDEV 234. The storage controller 131 has a VDEV Management Table 262 and a Page Management Table 263 that are used to realize the VDEV 132 by the volume controller 253. The storage controller 131 has a LU-Volume-VHD Mapping Table 264 that is used to map the VDEV 132 or LDEV 234 to the logical unit (LU) 271 (271a or 271b) by the volume controller 253. The LU-Volume-VHD Mapping Table 264 is also used to map the VHD File 113 to the LU 271. The disk controllers 246 are connected with a bunch of disks 231.

Multiple logical devices (LDEV) 234 are created in the storage apparatus 103. Each LDEV 234 is carved from the array group 233, which is composed as a RAID (Redundant Array of Independent Disks). Each array group 233 may be composed of different types of disk and different types of RAID. Each array group 233 is controlled by the storage controller 131. Multiple pages 172 are created in the storage apparatus 103. Each page is carved from the LDEV 234, which is carved from the array group 233. The pages are used to realize the VDEV 132.

The LU 271 is the name of the LDEV 234 or VDEV 132 when the LDEV 234 or VDEV 132 is exposed to the host computer 102. In other words, each LU 271 is configured to accept the access from a specific host computer 102. These mappings between the LU 271 and the LDEV 234 or VDEV 132 are defined in the LU-Volume-VHD Mapping Table 264.

Figure 3:
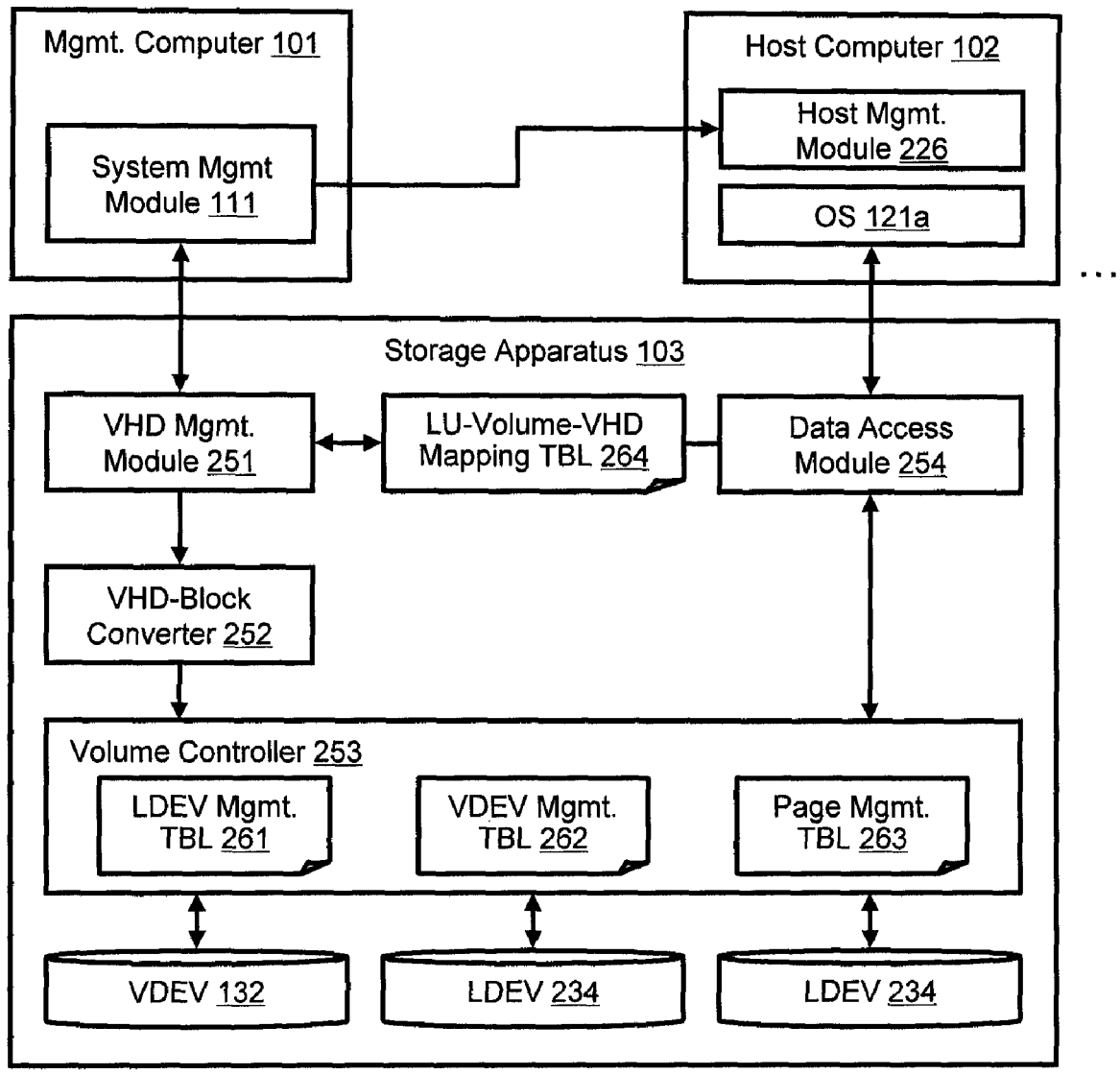
FIG. 3 is an example of a functional block diagram of the storage system of FIG. 2 according to the first embodiment.

FIG. 3 is an example of a functional block diagram of the storage system of FIG. 2 according to the first embodiment.

The system management module 111 conducts the migration from the virtual server to the host computer 102 by deploying the VHD File 113a to the VDEV 132 so that the host computer 102 can access the contents of the VHD File 113a. Alternatively, the system management module 111 simply conducts the deployment of the VHD File 113a to the VDEV 132. The system management module 111 sends the VHD File 113a to the VHD management module 251. The VHD-block converter 252 reads the capacity and the block size of the virtual hard disk from the header part of the VHD File 113a and invokes the volume controller 253 to create the VDEV 132. The volume controller 253 creates the VDEV 132 corresponding to the VHD File 113a so that the capacity and the page size of the VDEV 132 become the same as those of the VHD File 113a.

The VDEV 132 is defined in the VDEV Management Table 262 and Page Management Table 263 virtually. The actual data read or written by the host computer 102 is done to the page on the LDEV 234. The VDEV 132 is defined as the LU 271 in the LU-Volume-VHD Mapping Table 264 by the VHD management module 251. The VHD management module 251 returns the LU ID to the system management module 111 after the deployment of the VHD File 113a. The system management module 111 sets the logical unit ID to the host management module 226 in the host computer 102. Then, the system management module 111 sends the power on command to make the host computer 102 boot up from the deployed VHD File 113a, actually from the VDEV 132. As the host management module 226 receives the power on command, the host computer 102 boots up and the OS 121a initiates and starts to read data by accessing the data access module 254. The data access module 254 identifies which VDEV 132 stores the OS data using the LU-Volume-VHD Mapping Table 264.

FIG. 4 shows an example of a VM Spec File 112 that defines the configuration of the virtual machine. The VM Spec File 112 has a Name column 401 and a Value column 402. This file has information such as the number of the logical CPU 411, the size of the logical memory 412, the name of the VHD File 113 used as the hard disk drive of the virtual machine 413, the number of network interface card 414, the number of CD-ROM drives 415, and so on.

FIG. 5 shows an example of a Host Table 114 that resides in the management computer 101. This table contains the status and configuration information for each host computer 102. This table is used by the system management module 111 in order to find the appropriate host computer 102 according to the VM Spec File 112. The Host ID 501 identifies the host computer 102. The Status 502 is the status of the host computer 102. The "Allocated" status means that the host computer 102 is already used for other purposes. The "Free" status means that the host computer 102 can be a target of migration destination. The Type 503 is the type of the host computer 102. The value of the Type 503 can be "Physical Server" or "Logical Partitioning." "Physical Server" means that the host computer 102 is a stand alone server or a blade server in the blade server chassis. "Logical Partitioning" is the technology that divides one physical server into multiple logical servers. Each logical partition acts as an independent computer. Logical partitioning is different from recent server virtualization technology. The logical partition can directly access the block storage interface such as the fiber channel interface. The CPUs 504 is the number of CPUs. The Memory 505 is the size of memory. The NIC 506 is the number of the network interface cards. The CD-ROM 507 is the number of CD-ROM Drives. The table shows records 511 to 517. The record 517 which has a Host ID 501 "POOL" has special meaning. As mentioned above, the logical partitioning technology can divide one physical server into multiple logical servers. If the value of the Host ID 501 is "POOL", the system management module 111 can configure the host computer as a deployment destination within the constraint of the CPUs 504, Memory 505, NIC 506, CD-ROM 507, and so on.

FIG. 6 shows an example of an LDEV Management Table 261 that resides in the storage controller 131 of the storage apparatus 103. This table contains the LDEV configuration that is defined by the volume controller 253 which resides in the storage controller 131. This table is used by the volume controller 253 in order to carve the page from the LDEV 234 to organize the virtual volume VDEV. The Array Group 601 identifies the array group 233 which is composed by a plurality of disks 231. The Size 602 is the size (capacity) of the Array Group 601. The RAID Type 603 is the RAID level of that array group 233. The LDEV ID 604 identifies the LDEV 234 carved from the array group 233. The Start LBA 605 is the start logical block address of the LDEV 234. The End LBA 606 is the end logical block address of the LDEV 234. The Use 607 represents the purpose of the LDEV 234. "DEDICATED" means that the LDEV 234 is used for other purposes. "FOR PAGE" means that the LDEV can provide pages for the VDEV 132. For example, LDEV-101 621 and LDEV-102 622 are not used for the page of the VDEV 132. LDEV-201 623 and LDEV-301 624 may be already used for the page of some VDEVs and can be used for the page in the future if its capacity permits. The carving of the page is made by the volume controller 253 and defined in Page Management Table 263. The table shows records 611 to 613.

FIG. 7 shows an example of a VDEV Management Table 262 that resides in the storage controller 131 of the storage apparatus 103. This table contains the VDEV configuration that is defined by the volume controller 253 which resides in the storage controller 131. This table is used by the volume controller 253 in order to organize the VDEV 132 using pages. The VDEV ID 701 identifies the virtual device VDEV which is composed of a plurality of pages. The Size 702 is the size (capacity) of the Array Group 601. Actually this capacity is virtual and just a definition. When the actual access comes to this VDEV, the page will be allocated and be accessed. Thus, the actual capacity is smaller than the Size 702 (defined capacity). This is the merit of the thin provisioning technology. The Page Size 703 is the size of page. It means that this is the unit of size when the VDEV 132 is expanded by allocation of the page. The VLBA 704 is the logical block address LBA for the VDEV 132. The Page ID 705 identifies the page allocated to the VDEV 132. Multiple pages can be allocated for one VDEV 132. For example, VDEV-001 711 has virtually 3 Tera Bytes capacity, its page size is 2 Mega Byte, the VLBA starts by "0," and the actual data area is provided by "Page-101" 721 and "Page-102" 722. The table shows records 711 to 713.

FIG. 8 shows an example of a Page Management Table 263 that resides in the storage controller 131 of the storage apparatus 103. This table contains the page configuration that is carved by the volume controller 253 that resides in the storage controller 131. This table is used by the volume controller 253 in order to manage the page for the VDEV 132. The Page ID 801 identifies the page carved from the LDEV 234. The LDEV 802 lists the LDEV 234 where the page actually exists. The LBA 803 is the logical block address of the LDEV allocated to the page. The Page Size 804 is the size (capacity) of the page. The table shows records 811 to 815.

FIG. 9 shows an example of a LU-Volume-VHD Mapping Table 264 that resides in the storage controller 131. This table contains the mapping information between the LU (Logical Unit) 271, LDEV 234, and VHD File 113. The LU ID 901 is the logical unit identifier that is exposed or presented to the host computer 102. The Type 902 is the type of volume. The value of the Type 902 will be either "LDEV" or "VDEV." "LDEV" indicates that the volume mapped to the LU is "LDEV." "VDEV" indicates that the volume mapped to the LU is "VDEV." The Volume ID 903 identifies the volume (LDEV or VDEV) in the storage apparatus 103. The VHD ID 904 identifies the virtual hard disk. It may be the filename of the VHD File 113. In FIG. 9, record 911 shows that LU-001 is mapped to LDEV-001. In a similar way, record 912 shows that LU-002 is mapped to the VDEV-001. Also, record 913 shows that LU-003 is mapped to the VDEV-003 which is converted from VHD-001.vhd. The table shows records 911 to 915.

Figure 10:
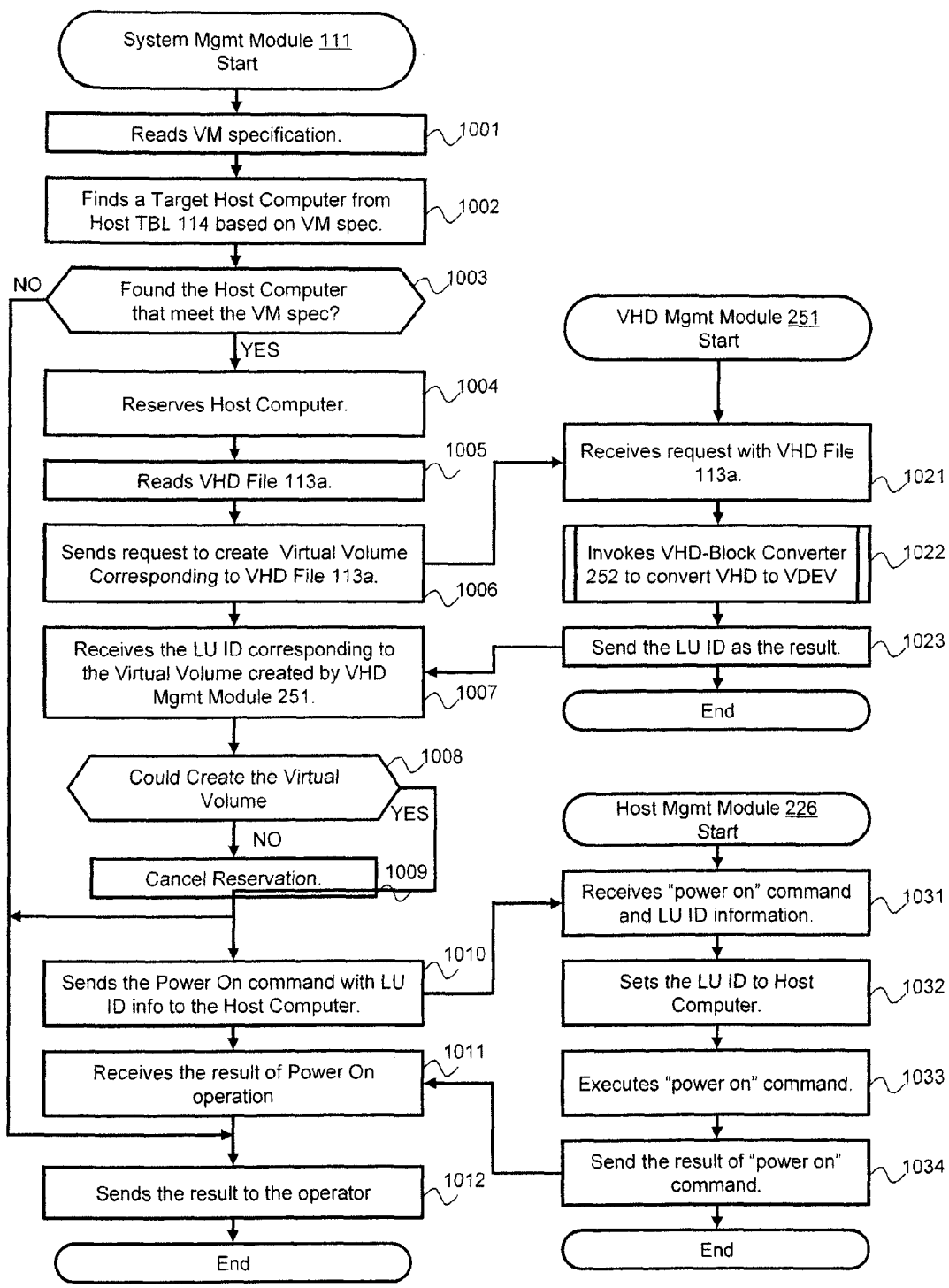
FIG. 10 shows an example of a process flow diagram for the image to physical server migration according to the first embodiment.

FIG. 10 shows an example of a process flow diagram for the image to physical server migration according to the first embodiment. This example illustrates a representative virtual hard disk deployment processing in a specific embodiment of the present invention. In this flow diagram, there are three programs. The system management module 111 resides in the management computer 101, the VHD management module 251 resides in the storage controller 131, and the host management module 226 resides in the host computer 102. The system management module 111 initiates the process by the user.

As illustrated in FIG. 10, in step 1001, the system management module 111 reads the virtual machine specification from the VM Spec File 112. In step 1002, the system management module 111 finds a target host computer from the Host Table 114 based on the specification read in step 1001. According to the VM Spec File 112 shown in FIG. 4, the VM spec needs to meet the condition of two CPU, 1024 byte memory, two NIC, and one CD-ROM. The host computer on the record 512 in the Host Table 114 shown in FIG. 5 meets that condition. Hence, the system management module 111 decides to use HOST-002 as a deployment destination. In case that the system management module 111 cannot find the host computer of the physical server, the system management module 111 may create the logical partition from the POOL 517 as a deployment destination.

In step 1003, the system management module 111 checks whether the host computer that meets the VM Spec is found or not. If yes, the process proceeds to step 1004. If no, it goes to step 1012. In step 1004, the system management module 111 reserves that host computer. In step 1005, the system management module 111 reads the VHD File whose name is specified in the HDD entry of the VM Spec File 112. According to the VM Spec File 112 shown in FIG. 4, the filename of the VHD File is "VirtualDisk.vhd." In step 1006, the system management module 111 sends a request to create the virtual volume corresponding to the VHD File 113a. In step 1021, the VHD management module 251 receives the request with the VHD File 113a. In step 1022, the VHD management module 251 creates the virtual volume (VDEV) based on the VHD File 113a received in step 1021. In step 1023, the VHD management module 251 sends back the LU ID as the result of virtual hard disk creation. In step 1007, the system management module 111 receives the LU ID corresponding to the virtual volume created by the VHD management module 251.

In step 1008, the system management module 111 checks whether the VHD management module 251 could create the virtual volume or not. If yes, the process proceeds to step 1010. If no, it goes to step 1009. In step 1009, the system management module 111 cancels the reservation of the host computer reserved in step 1004. In step 1010, the system management module 111 sends the power on command with LU ID to the host computer. In step 1031, the host management module 226 receives the power on command and LU ID. In step 1032, the host management module 226 sets the LU ID to the host computer. In step 1033, the host management module 226 executes the power on command. In step 1034, the host management module 226 sends back the result of the power on command. In step 1011, the system management module 111 receives the result of the power on operation. In step 1012, the system management module 111 sends the result to the operator of this system. The host computer initiates a boot up process with the assigned LU ID. The host computer further loads the contents of the VHD from the converted virtual volume.

Figure 11:
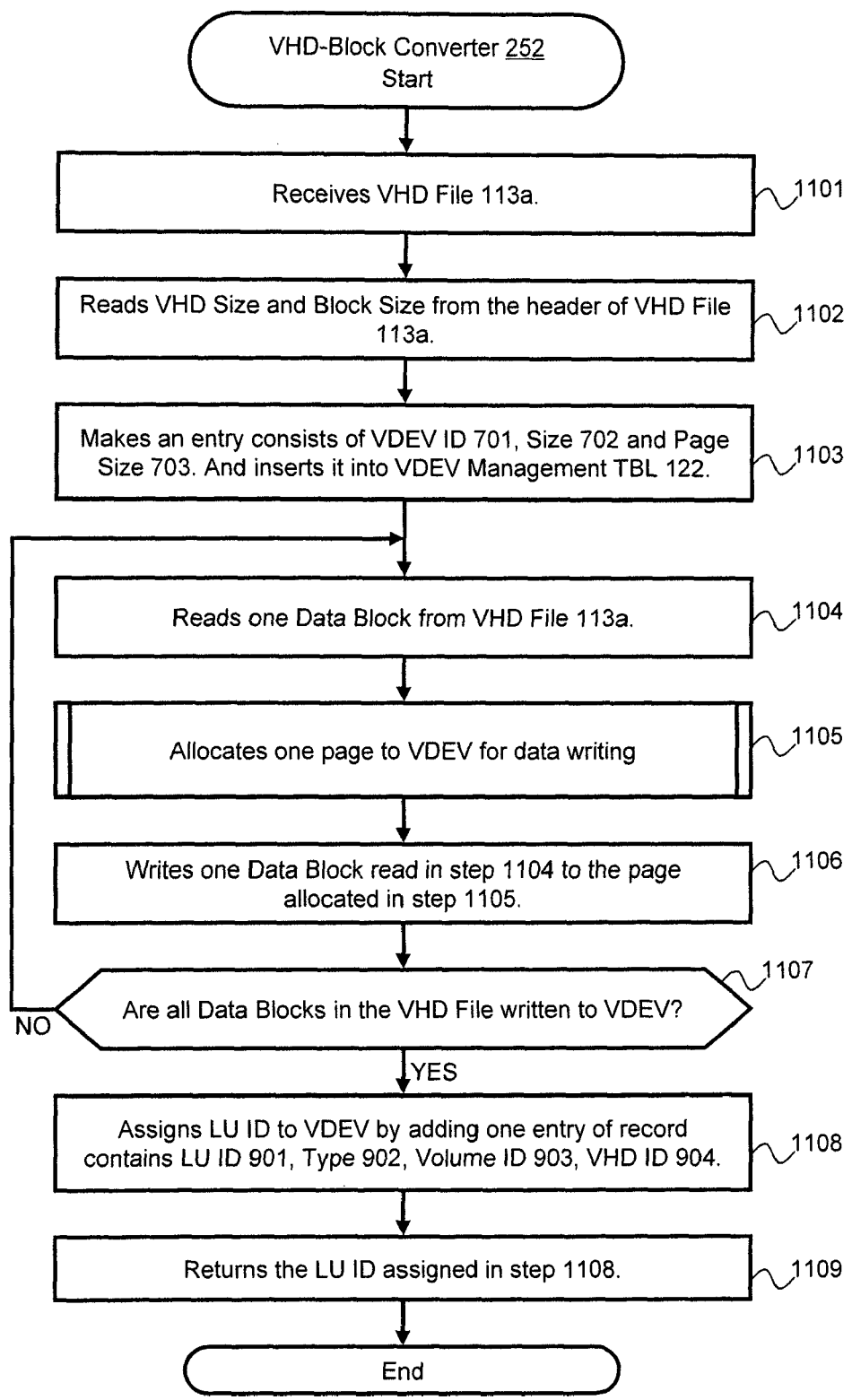
FIG. 11 shows an example of a process flow diagram for creating virtual volume based on the VHD spec.

FIG. 11 shows an example of a process flow diagram for creating virtual volume based on the VHD spec. The process creates the virtual volume and converts the VHD to the created virtual volume that is executed by the VHD-block converter 252 which resides in the storage controller 131.

In step 1101, the VHD-block converter 252 receives the VHD File 113a. In step 1102, the VHD-block converter 252 reads the VHD Size and Block Size from the header of the VHD File 113a. In step 1103, the VHD-block converter 252 makes an entry composed of the VDEV ID 701, Size 702, and Page Size 703, and inserts the entry into the VDEV Management Table 122. The values of Size 702 and Page Size 703 are decided based on the VHD Size and Block Size read in step 1102, respectively. The VHD Size does not mean the file size of the VHD File 113a but rather the size of the virtual hard disk realized inside of the VHD File 113a. In step 1104, the VHD-block converter 252 reads one data block from the VHD File 113a. In step 1105, the VHD-block converter 252 allocates one page to the VDEV for data writing. Note that the data block size and page size are the same. Allocating just one page works fine. In step 1106, the VHD-block converter 252 writes one data block read in step 1104 to the page allocated in step 1105.

In step 1107, the VHD-block converter 252 checks whether all data blocks in the VHD File 113a were written to the VDEV or not. If yes, the process proceeds to step 1108. If no, it goes back to step 1104. In step 1108, the VHD-block converter 252 assigns the LU ID to the VDEV by adding one entry of record which contains the LU ID 901, Type 902, Volume ID 903, and VHD ID 904. In step 1109, the VHD-block converter 252 returns the LU ID assigned in step 1108.

Figure 12:
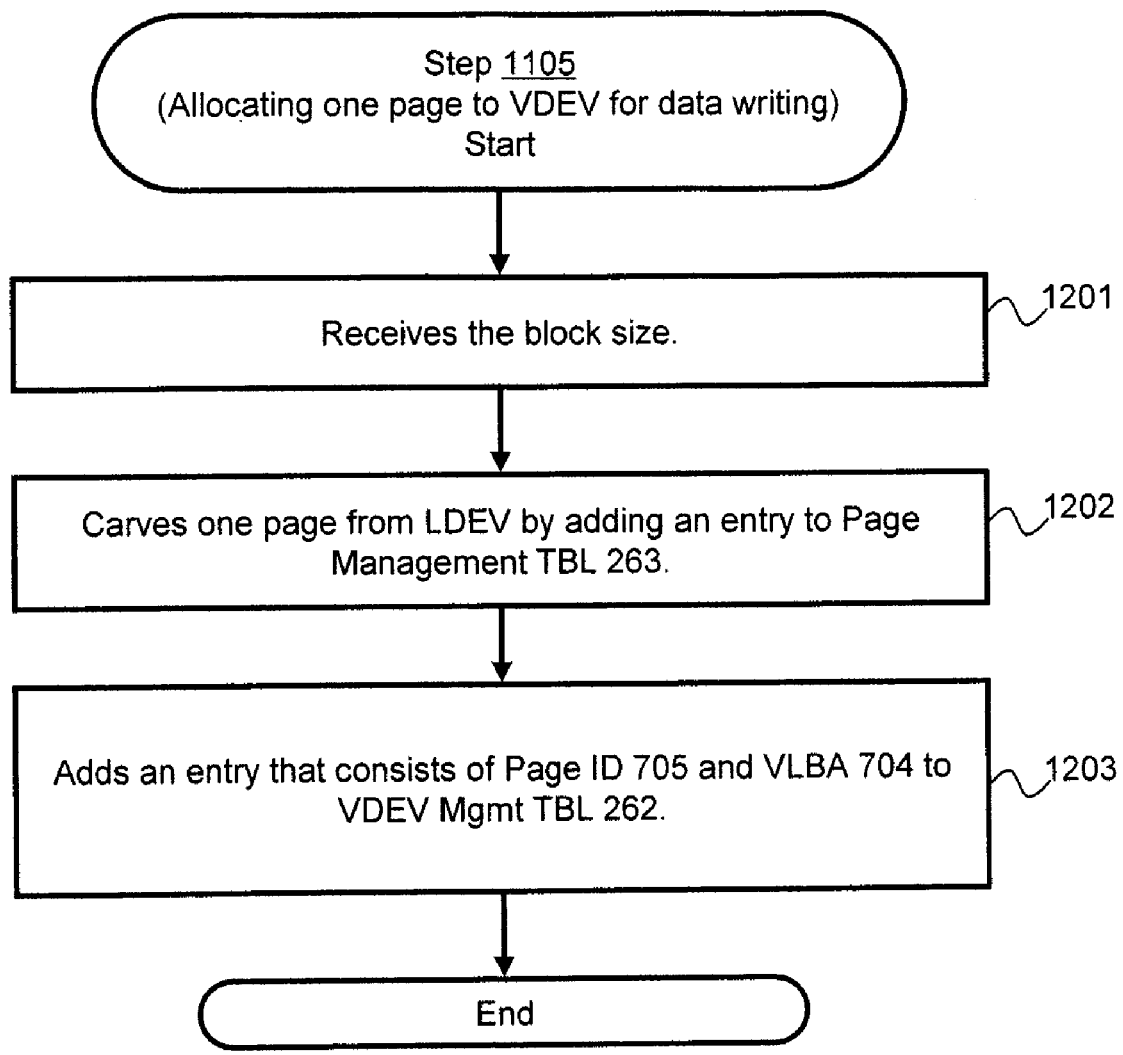
FIG. 12 shows an example of a process flow diagram for allocating one page to the VDEV for data writing.

FIG. 12 shows an example of a process flow diagram for allocating one page to the VDEV for data writing in step 1105 of FIG. 11. The process allocates one page to the VDEV that is executed by volume controller 253. In step 1201, the volume controller 253 receives the block size. In step 1202, the volume controller 253 carves one page from the LDEV by adding an entry composed of the Page ID 801, LDEV 802, LBA 803, and Page Size 804 to the Page Management Table 263. The page should be carved from the LDEV whose Use 607 is "FOR PAGE." The page should be carved from the LDEV having enough capacity. The capacity can be calculated by referring to the Page Management Table 263. The Page ID 801 should be generated uniquely. In step 1203, the volume controller 253 adds an entry composed of the Page ID 705 and VLBA 704 to the VDEV Management Table 262.

Figure 13:
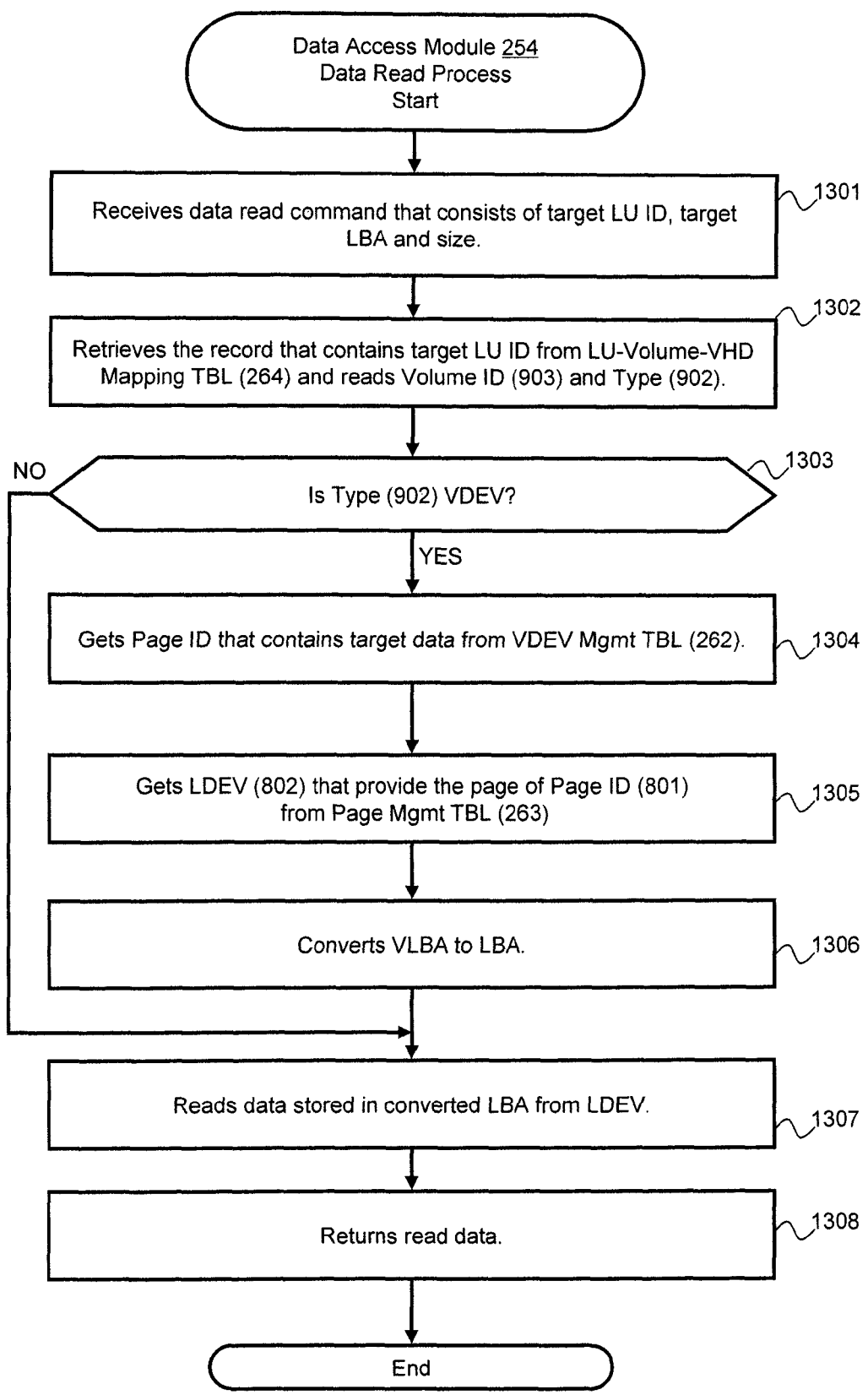
FIG. 13 shows an example of a process flow diagram for reading data of the VDEV by the host computer according to the first embodiment.

FIG. 13 shows an example of a process flow diagram for reading data of the VDEV by the host computer according to the first embodiment. In step 1301, the data access module 254 receives a data read command that includes the target LU ID, target LBA, and size from the host computer 102. For example, the target LU ID is "LU-002," the target LBA is "LBA:1024," and the size is 512. In step 1302, the data access module 254 retrieves the record that contains the target LU ID from the LU-Volume-VHD Mapping Table 264 and reads the Volume ID 903 and Type 902. For example, when the target LU ID is "LU-002," the Volume ID and Type would be "VDEV-001" and "VDEV," respectively, according to record 913 in FIG. 9.

In step 1303, the data access module 254 checks whether the Type 902 is "VDEV" or not. If yes, the process proceeds to step 1304. If no, it goes to step 1307. In step 1304, the data access module 254 gets the Page ID that contains the target data from the VDEV Management Table 262. The host computer 102 requests to read data with the LBA. The target data can be found by the VLBA in the case where the volume type is "VDEV." For example, when the LBA is "LBA:1024," the Page ID would be "Page-101" (record 721 in FIG. 7). That is why "VLBA:1024" is between "VLBA:0" and "VLBA:4096." In step 1305, the data access module 254 gets the LDEV 802 that provides the page of the Page ID 801 from the Page Management Table 263 obtained in step 1304. For example, when the Page ID is "Page-101," the LDEV would be "LDEV-201." In step 1306, the data access module 254 converts the VLBA to LBA. For example, when the target LBA (=VLBA) is "LBA:1024," the LBA where the actual data is stored would be "LBA:3072" (1024+2048). In step 1307, the data access module 254 reads data stored in the converted LBA from the LDEV. For example, in the end, the data access module 254 reads data from "LBA:3072" to "LBA:3584" of LDEV-201. In the case where the volume type is "LDEV," the data access module 254 reads data from "LBA:1024" to "LBA:1536" without address conversion. In step 1308, the data access module 254 returns the read data. In the case where the requested data is stored over multiple pages, the data access module 254 executes steps 1304 to 1307 repeatedly.

Figure 14:
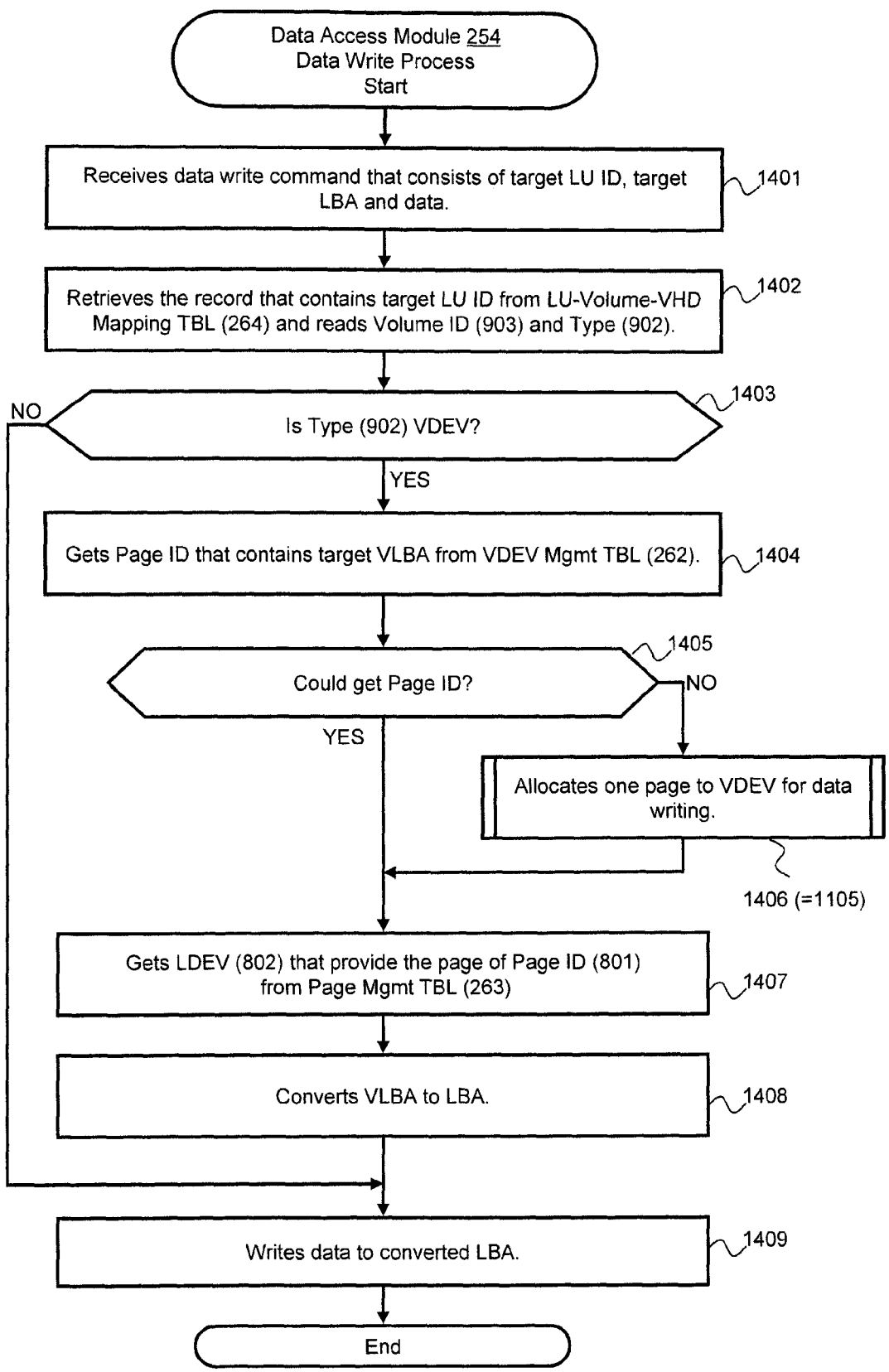
FIG. 14 shows an example of a process flow diagram for writing data to the VDEV from the host computer according to the first embodiment.

FIG. 14 shows an example of a process flow diagram for writing data to the VDEV from the host computer according to the first embodiment. In step 1401, the data access module 254 receives a data write command composed of the target LU ID, target LBA, and data to be written from the host computer 102. For example, the target LU ID is "LU-002" and the target LBA is "LBA:1024." In step 1402, the data access module 254 retrieves the record that contains the target LU ID from the LU-Volume-VHD Mapping Table 264, and reads the Volume ID 903 and Type 902. For example, when the target LU ID is "LU-002," the Volume ID and Type would be "VDEV-001" and "VDEV," respectively, according to record 913 in FIG. 9.

In step 1403, the data access module 254 checks whether the Type 902 is "VDEV" or not. If yes, the process proceeds to step 1404. If no, it goes to step 1409. In step 1404, the data access module 254 gets the Page ID that contains the target VLBA from the VDEV Management Table 262. The host computer 102 requests to write data with the LBA. The target area can be found by the VLBA (=requested LBA) in the case where the volume type is "VDEV." For example, when the LBA is "LBA:1024," the Page ID would be "Page-101" (record 721 in FIG. 7). That is why "VLBA:1024" is between "VLBA:0" and "VLBA:4096." In step 1405, the data access module 254 checks whether the page could be found or not. If yes, the process proceeds to step 1407. If no, it goes to step 1406. Because allocating a new page every time the data area becomes necessary is a strong characteristic of thin provisioning, there may be cases where the data write destination area has not been allocated when the data is about to be written. In step 1406, the data access module 254 allocates one page to the VDEV for data writing. In step 1407, the data access module 254 gets the LDEV 802 that provides the page of the Page ID 801 from the Page Management Table 263 obtained in step 1404. For example, when the Page ID is "Page-101," the LDEV would be "LDEV-201." In step 1408, the data access module 254 converts the VLBA to LBA. For example, when the target LBA (=VLBA) is "LBA:1024," the LBA where actual data is stored would be "LBA:3072" (1024+2048). In step 1409, the data access module 254 writes data to the converted LBA of the LDEV. For example, in the end, the data access module 254 writes data from "LBA: 3072" of LDEV-201. In the case where the volume type is "LDEV," the data access module 254 writes data from "LBA: 1024" without address conversion.

Second Embodiment

Figure 15:
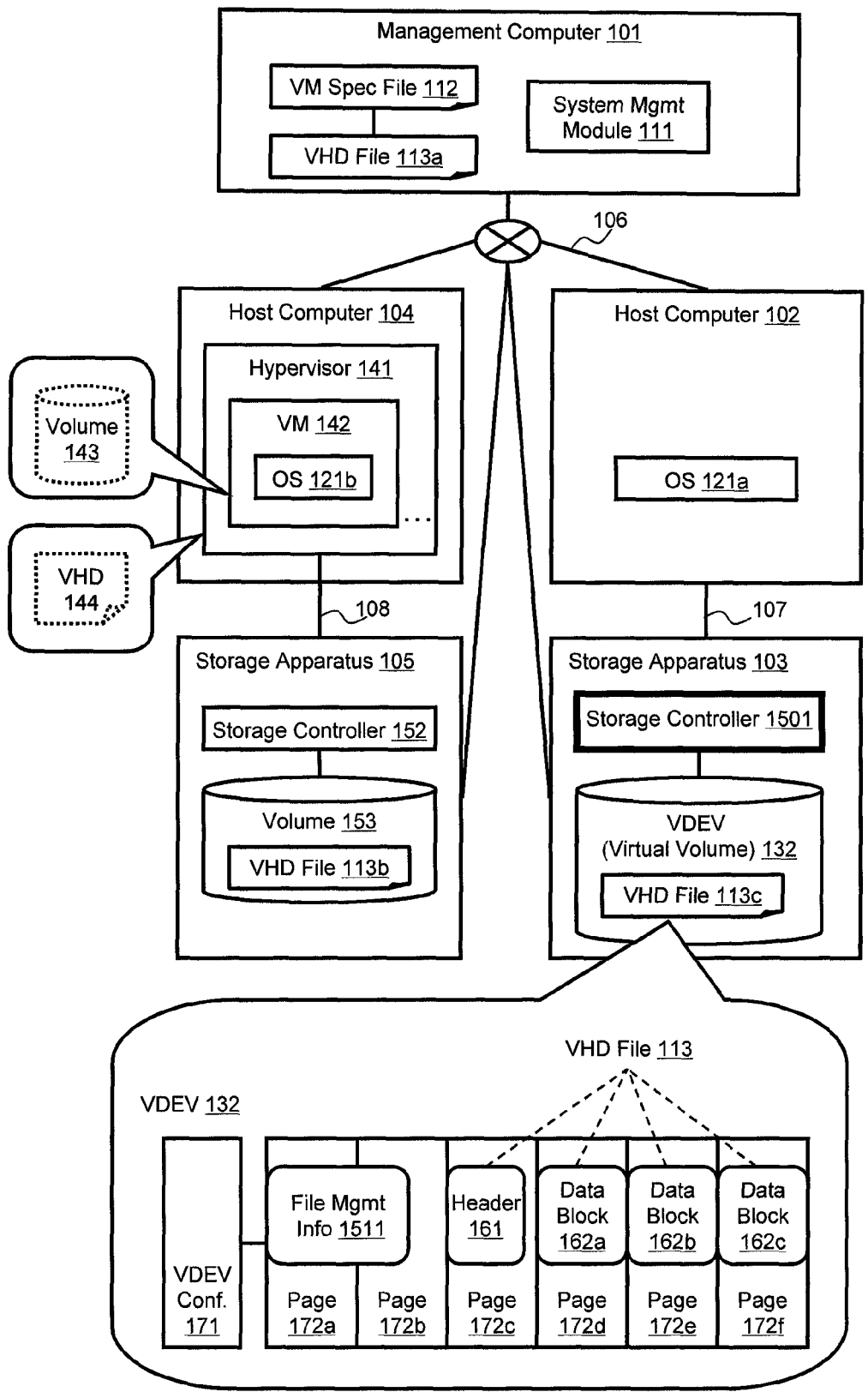
FIG. 15 shows an overview of the virtual to physical migration of a server computer according to a second embodiment of the invention.

FIG. 15 shows an overview of the virtual to physical migration of a server computer according to a second embodiment of the invention. There are a number of differences between the first embodiment of FIG. 1 and the second embodiment of FIG. 15. In the first embodiment, the VHD File is converted to the VDEV. In the second embodiment, the VHD File 113c is stored in the VDEV as a file. In the first embodiment, the VHD File is converted so that the page size of the VDEV becomes the same as that of VHD File. In the second embodiment, the VHD file is stored in the formatted area of the file system so that the page size of the VDEV becomes the same as that of the VHD File.

In FIG. 15, "1501" denotes the storage controller that resides in the storage apparatus 103. The storage controller 1501 controls the deployment of the VHD File 113c to the VDEV 132 and the input/output between the host computer 102 and the storage apparatus 103. Further, "171" denotes the VDEV configuration which includes the LDEV Management Table 261, VDEV Management Table 262, and Page Management Table 263. The VDEV configuration 171 is used for realizing the VDEV (thin provisioning technology) by the storage controller 1501. "172" denotes the page where the user data is actually stored, and "1511" denotes the management information of the file system 1602. This management information is also stored in the VDEV. "161" denotes the header area in the VHD File 113. The header 161 contains the management information for the virtual hard disk realized within the VHD File 113. "162" denotes the data blocks of the virtual hard disk realized within the VHD File 113. The VHD File 113 includes the header 161 and data block 162. Making the size of the page 172 the same as the size of the data block 162 leads to improvement of the storage capacity efficiency and input/output performance. In addition, the VHD File 113 can be handled as a file, so that the user of this system can easily transfer it to another location via a network file transfer interface such as NFS/CIFS.

Figure 16:
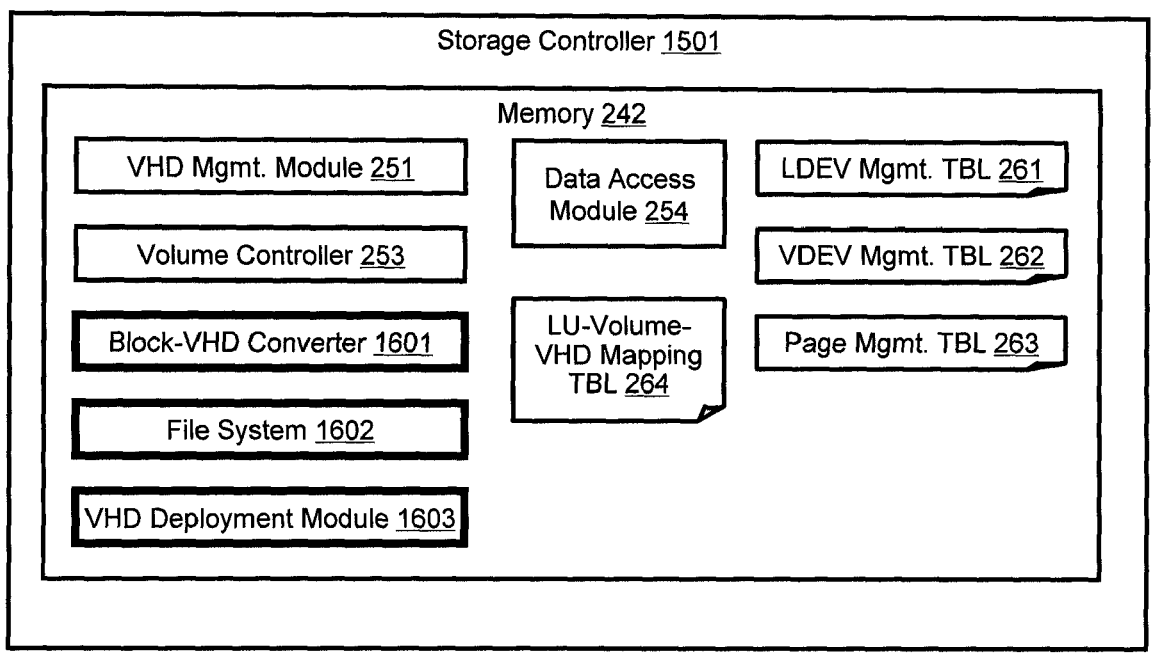
FIG. 16 shows an example of software modules and tables in the memory of the storage controller of the storage apparatus according to the second embodiment.

FIG. 16 shows an example of software modules and tables in the memory of the storage controller of the storage apparatus according to the second embodiment. The main difference between the first embodiment (FIG. 2) and the second embodiment is that the storage controller 1501 resides in the storage apparatus 103, and has the block-VHD converter 1601, file system 1602, and VHD deployment module 1603.

Figure 17:
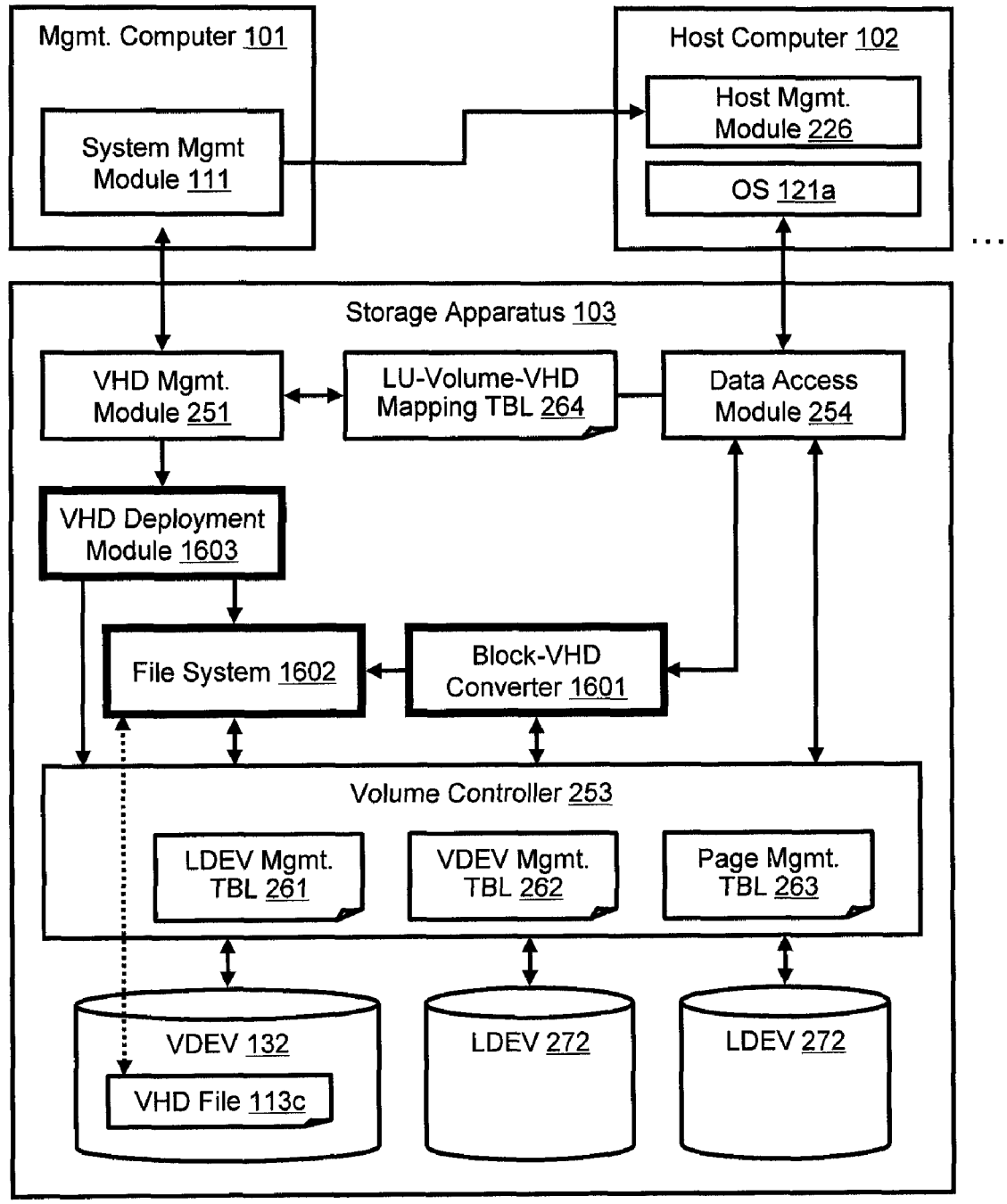
FIG. 17 is an example of a functional block diagram of the storage system according to the second embodiment.

FIG. 17 is an example of a functional block diagram of the storage system according to the second embodiment. The input and output interfaces between the management computer 101, host computer 102, and storage apparatus 103 are the same as those of the first embodiment (FIG. 3). The system management module 111 conducts the migration from the virtual server to the host computer 102 by deploying the VHD File 113a to the VDEV 132 so that the host computer 102 can access the contents of the VHD File 113a. Alternatively, the system management module 111 simply conducts the deployment of the VHD File 113a to the VDEV 132. The system management module 111 sends the VHD File 113a to the VHD management module 251. The VHD deployment module 1603 gets the file size of the VHD File 113a and reads the block size of the virtual hard disk from the header part of the VHD File 113a, and invokes the volume controller 253 to create the VDEV 132. The volume controller 253 creates the VDEV 132 so that the page size of the VDEV 132 becomes the same as the block size of the VHD File 113a. The file system 1602 formats the created VDEV 132. The VHD deployment module 1603 copies the VHD File 113a to the formatted VDEV 132 as 113c. The VDEV 132 is defined as the LU 271 in the LU-Volume-VHD Mapping Table 264 by the VHD management module 251.

The VHD management module 251 returns the LU ID to the system management module 111 after the deployment of the VHD File 113a. The system management module 111 sets the logical unit ID to the host management module 226 in the host computer 102. Then, the system management module 111 sends the power on command to make the host computer 102 boot up from the deployed VHD File 113a, actually from the VDEV 132. As the host management module 226 receives the power on command, the host computer 102 boots up and the OS 121a initiates and starts to read data by accessing data access module 254. The data access module 254 identifies which VHD File 113a stores the OS data by referring to the LU-Volume-VHD Mapping Table 264.

Figure 18:
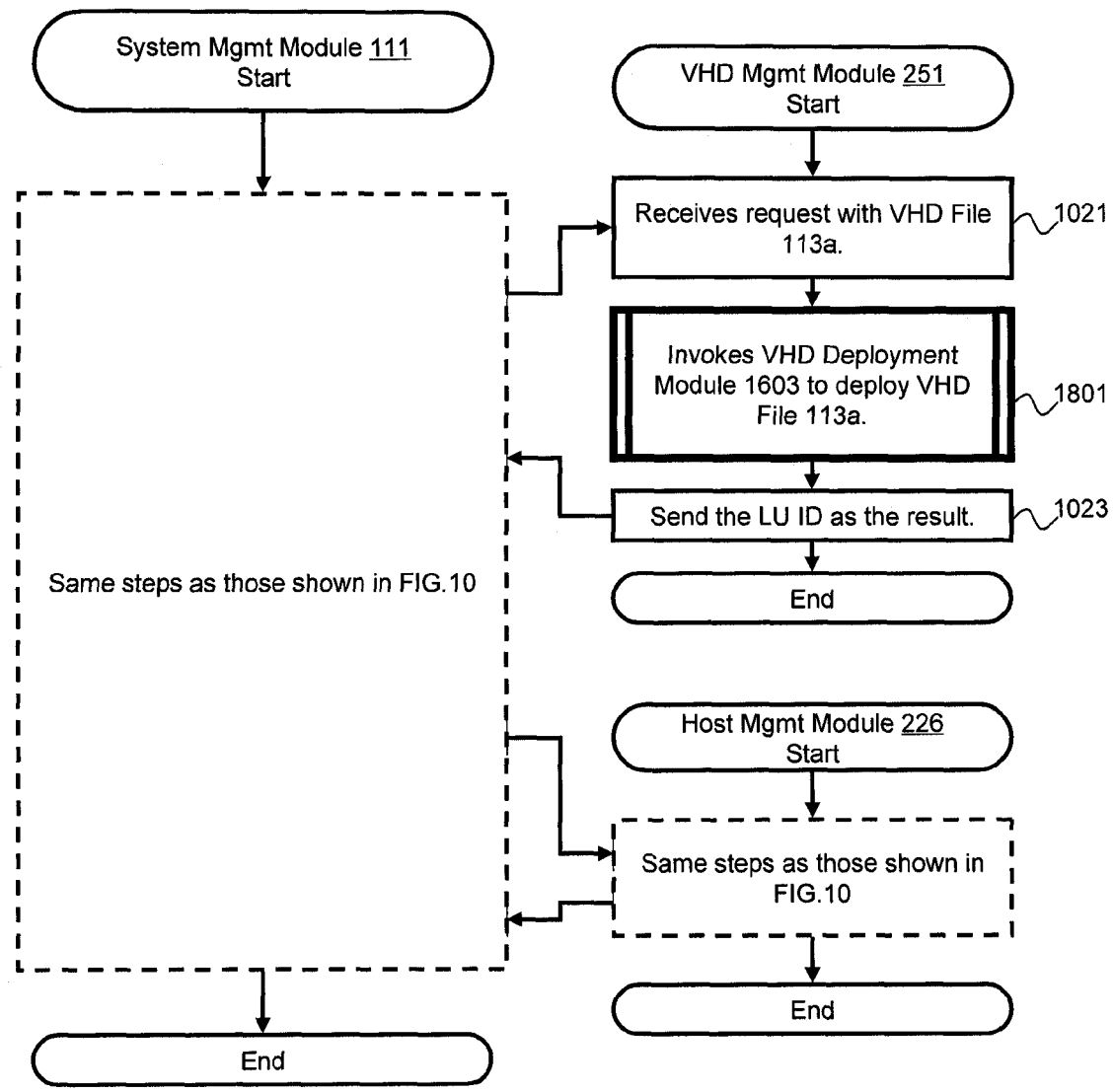
FIG. 18 shows an example of a process flow diagram for the image to physical server migration according to the second embodiment.

FIG. 18 shows an example of a process flow diagram for the image to physical server migration according to the second embodiment. The steps of the system management module 111 and the host management module 226 are the same as those in the first embodiment (FIG. 10). The input and output of the VHD management module 251 are also the same as those in the first embodiment (FIG. 10). Step 1022 of FIG. 10 is replaced by step 1801 of FIG. 18. In step 1801, the VHD management module 251 invokes the VHD deployment module 1603 to deploy the VHD File 113a.

Figure 19:
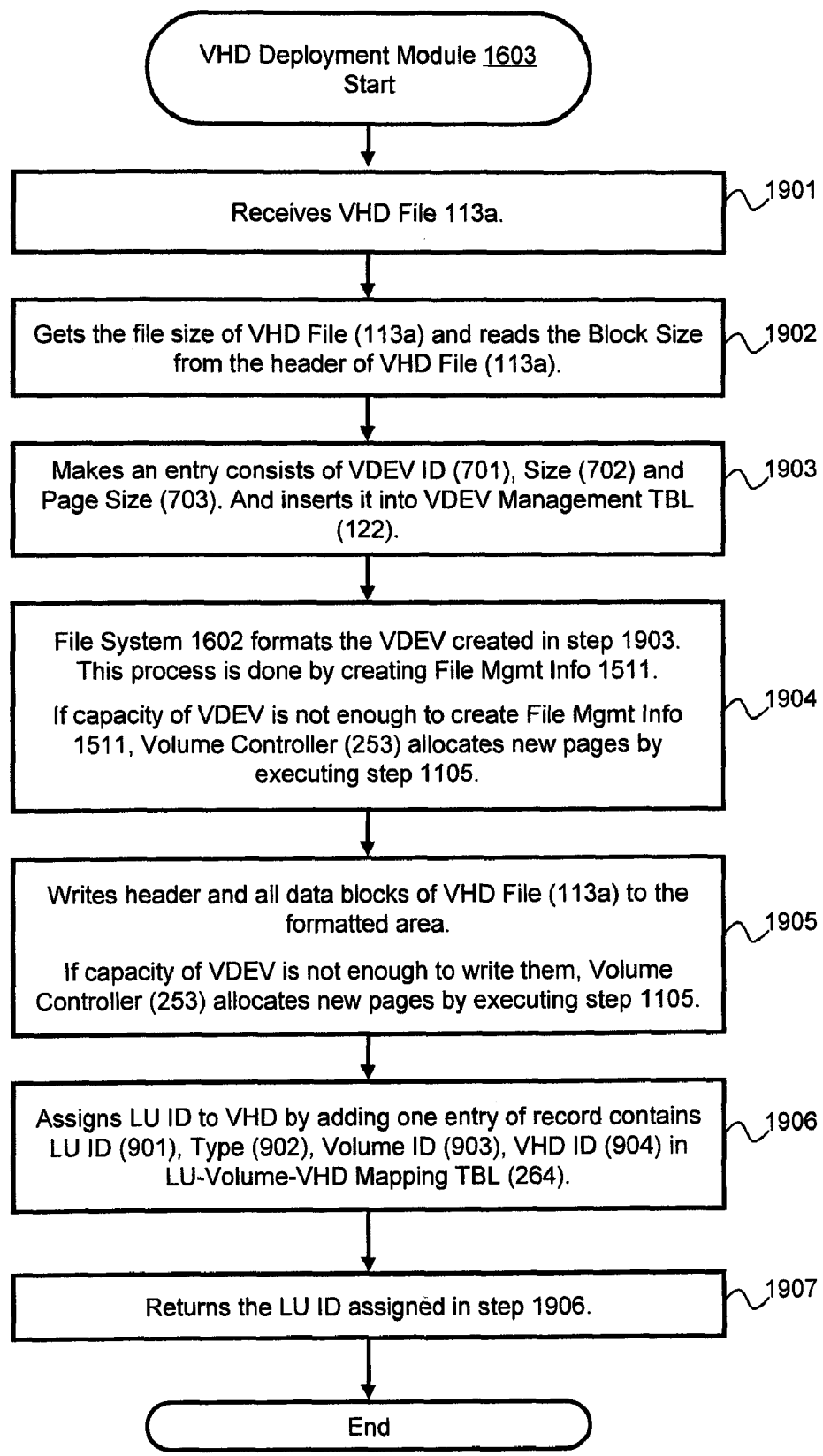
FIG. 19 shows an example of a process flow diagram for deploying the VHD File to the VDEV.

FIG. 19 shows an example of a process flow diagram for deploying the VHD File to the VDEV. The process creates the virtual volume and deploys the VHD File 113a to the created virtual volume which is executed by the VHD deployment module 1603 that resides in the storage controller 131.

In step 1901, the VHD deployment module 1603 receives the VHD File 113a. In step 1902, the VHD deployment module 1603 gets the file size of the VHD File 113a and reads the Block Size from the header of the VHD File 113a. In step 1903, the VHD deployment module 1603 makes an entry composed of the VDEV ID 701, Size 702, and Page Size 703, and inserts the entry into the VDEV Management Table 122. The values of the Size 702 and Page Size 703 are decided based on the file size of the VHD File 113a and Block Size obtained in step 1902, respectively. In step 1904, the file system 1602 formats the VDEV created in step 1903. This process is done by creating the file management information 1511. If the capacity of the VDEV is not enough to create the file management information 1511, the volume controller 253 allocates new pages by executing step 1105 (FIG. 11). In step 1905, the VHD deployment module 1603 writes the header and all data blocks of the VHD File 113a to the formatted area. If the capacity of the VDEV is not enough to write them, the volume controller 253 allocates new pages by executing step 1105. In step 1906, the VHD deployment module 1603 assigns the LU ID to the VHD by adding one entry of record containing the LU ID 901, Type 902, Volume ID 903, and VHD ID 904 in the LU-Volume-VHD Mapping Table 264. In step 1907, the VHD deployment module 1603 returns the LU ID assigned in step 1906.

Figure 20:
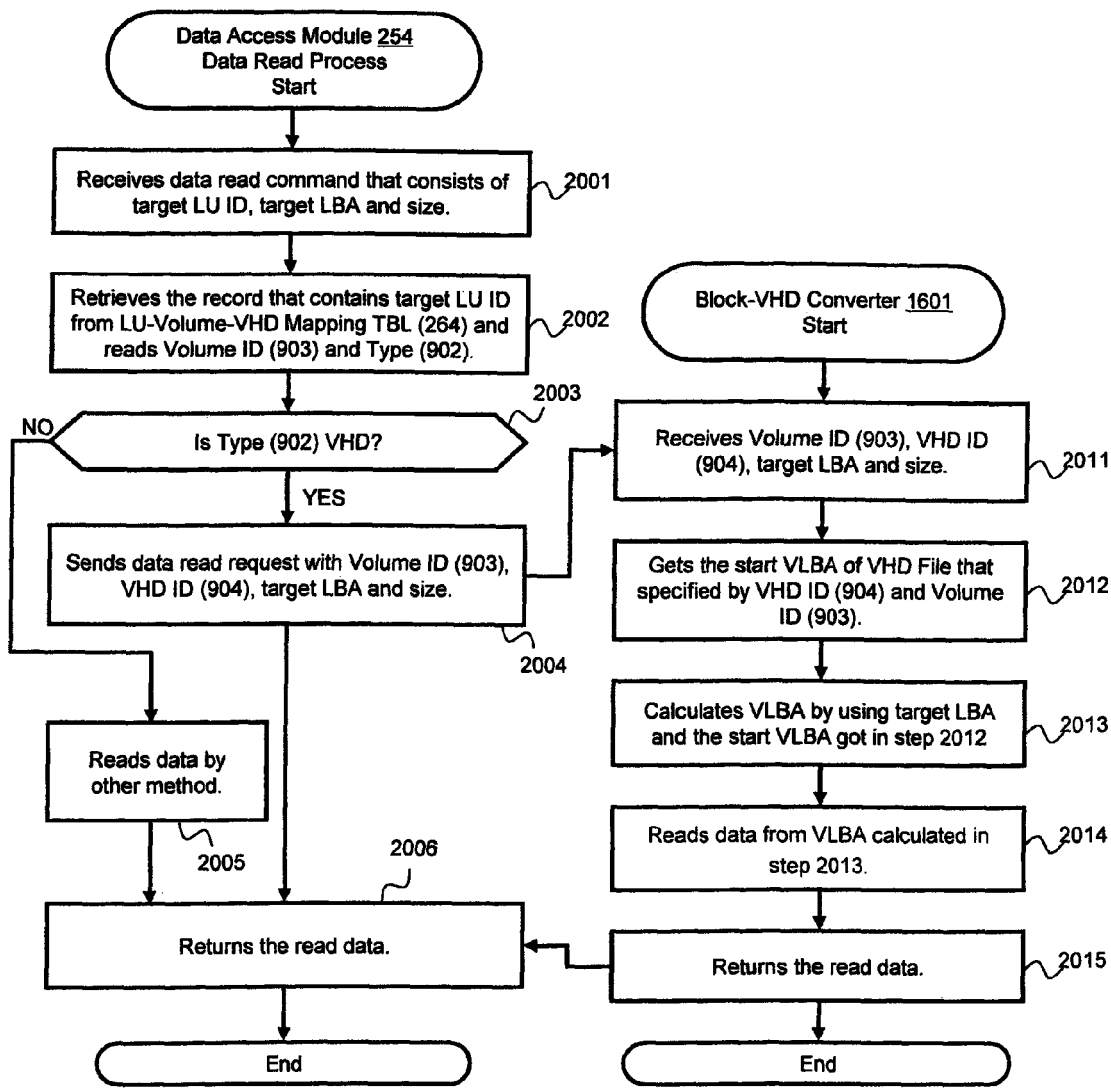
FIG. 20 shows an example of a process flow diagram for reading data of the VDEV by the host computer according to the second embodiment.

FIG. 20 shows an example of a process flow diagram for reading data of the VDEV by the host computer according to the second embodiment. In step 2001, the data access module 254 receives the data read command that includes the target LU ID, target LBA, and size from the host computer 102. In step 2002, the data access module 254 retrieves the record that contains the target LU ID from the LU-Volume-VHD Mapping Table 264 and reads the Volume ID 903 and Type 902. In step 2003, the data access module 254 checks whether the Type 902 is "VHD" or not. If yes, the process proceeds to step 2004. If no, it goes to step 2005. In step 2004, the data access module 254 sends a data read request with the Volume ID 903, VHD ID 904, target LBA, and size. In step 2011, the block-VHD converter 1601 receives the Volume ID 903, VHD ID 904, target LBA, and size. In step 2012, the block-VHD converter 1601 gets the start VLBA of the VHD File that is specified by the VHD ID 904 and Volume ID 903. In step 2013, the block-VHD converter 1601 calculates the VLBA by using the target LBA and the start VLBA obtained in step 2012. In step 2014, the block-VHD converter 1601 reads data from the VLBA calculated in step 2013. In step 2015, the block-VHD converter 1601 returns the read data. In step 2005, the data access module 254 reads data by some other method. In step 2006, the data access module 254 returns the read data.

Figure 21:
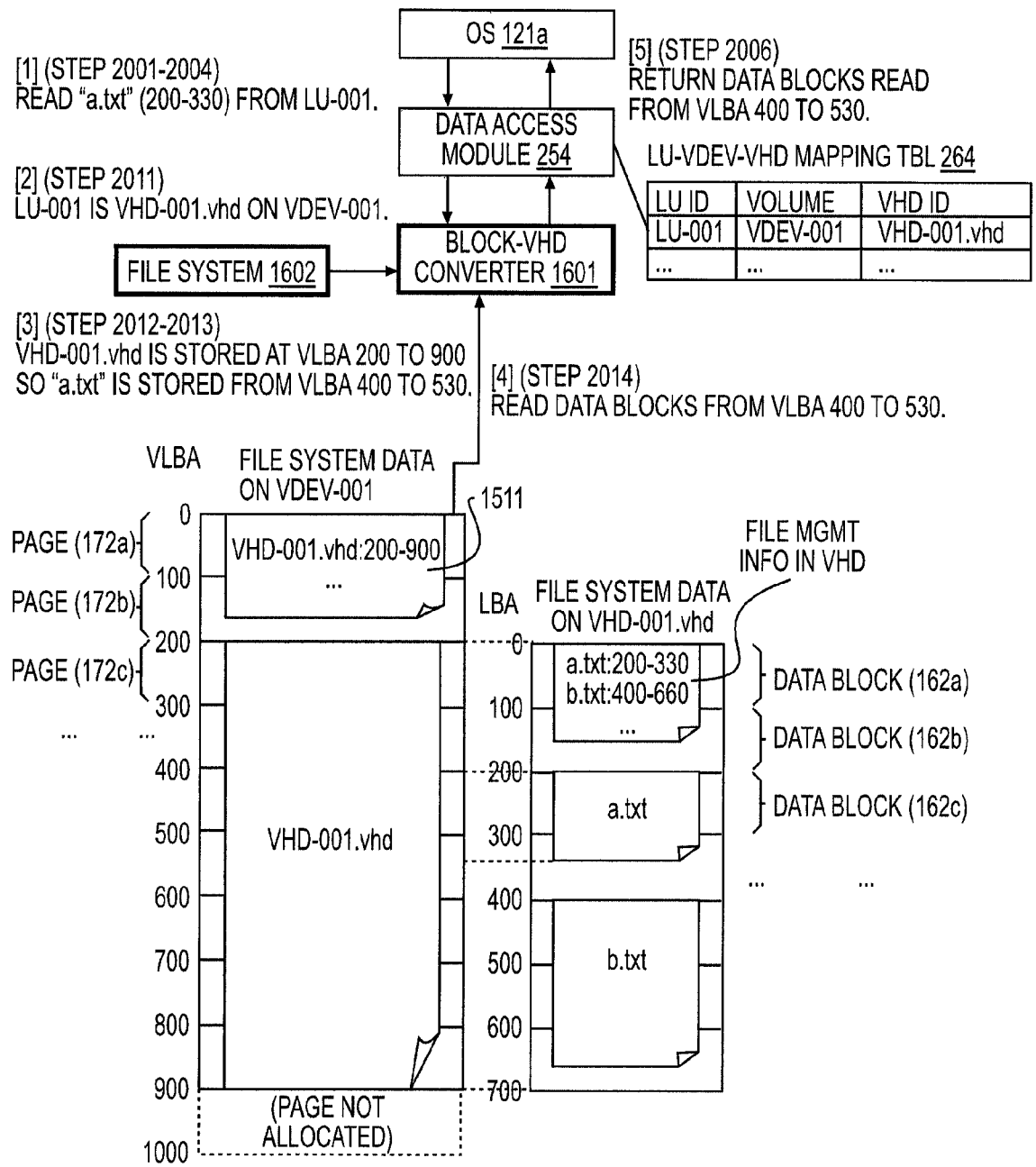
FIG. 21 shows an example of a process flow and a data structure for reading data of the VHD by the host computer.

FIG. 21 shows an example of a process flow and a data structure for reading data of the VHD 113 by the host computer 102. The data structure shown on the right side is the file system data on VDEV-001. The data structure shown on the left side is the file system data on VHD-001.vhd. VHD-001.vhd is stored from VLBA 200 to 900 on the file system data on VDEV-001. The file management information 1511 is stored from VLBA 0. The file management information 1511 manages which file is stored in which address (VLBA). Because the VHD File 113 acts as a physical hard disk, it can be formatted and has the file management information. The file management information is stored in the data blocks 162. The file management information contains the name of the file, the address of the file, and so on.

The process flow in FIG. 21 is summarized as follows. [1] In this example, the data access module 254 receives a data read command that says "Read data from the LBA from 200 to 330 ("a.txt") from LU-001" (steps 2001 to 2004). [2] The data access module 254 finds that LU-001 is assigned to VHD-001.vhd on VDEV-001 (step 2011). [3] The block-VHD converter 1601 finds that VHD-001.vhd is stored at VLBA 200 to 900, and also finds that LBA 200 to 330 ("a.txt") is stored from VLBA 400 to 530 (steps 2012 to 2013). [4] The block-VHD converter 1601 then reads data blocks from VLBA 400 to 530 (step 2014). [5] The data access module 254 returns the data blocks, which are read from VLBA 400 to 530, to the OS 121a (step 2006).

Figure 22:
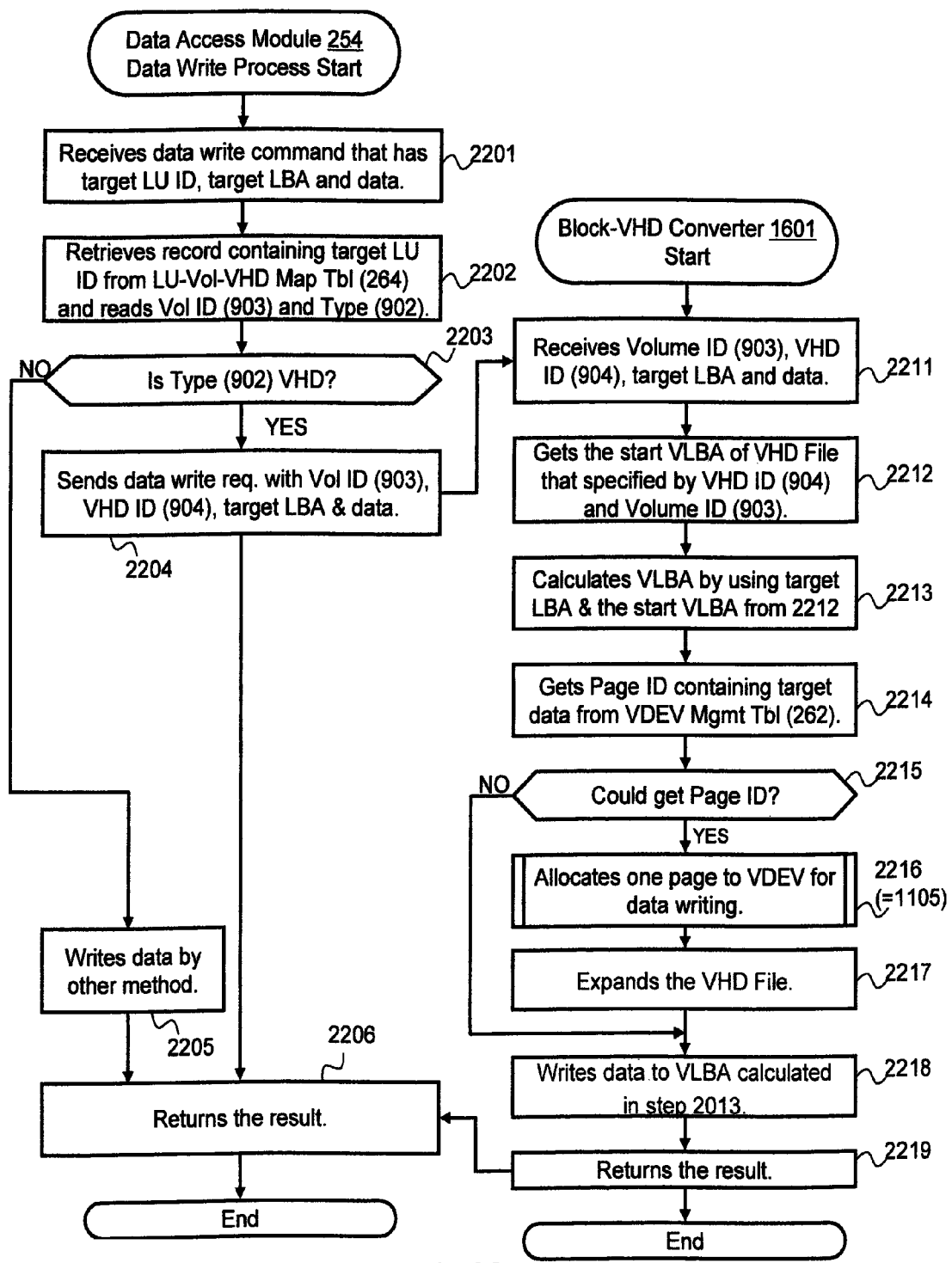
FIG. 22 shows an example of a process flow diagram for writing data to the VDEV from the host computer according to the second embodiment.

FIG. 22 shows an example of a process flow diagram for writing data of the VHD 113 to the VDEV from the host computer 102 according to the second embodiment. In step 2201, the data access module 254 receives a data write command that includes the target LU ID, target LBA, and data to be written by the host computer 102. In step 2202, the data access module 254 retrieves the record that contains the target LU ID from the LU-Volume-VHD Mapping Table 264 and reads the Volume ID 903 and Type 902. In step 2203, the data access module 254 checks whether the Type 902 is "VHD" or not. If yes, the process proceeds to step 2204. If no, it goes to step 2205. In step 2204, the data access module 254 sends the data write request with the Volume ID 903, VHD ID 904, target LBA, and data.

In step 2211, the block-VHD converter 1601 receives Volume ID 903, VHD ID 904, target LBA, and data. In step 2212, the block-VHD converter 1601 gets the start VLBA of the VHD File that is specified by the VHD ID 904 and Volume ID 903. In step 2213, the block-VHD converter 1601 calculates the VLBA by using the target LBA and the start VLBA obtained in step 2212. In step 2214, the block-VHD converter 1601 gets the Page ID that contains the target data from the VDEV Management Table 262. In step 2215, the block-VHD converter 1601 checks whether the page could be found or not. If yes, the process proceeds to step 2216. If no, it goes to step 2218. In step 2216, the volume controller 253 allocates one page to the VDEV for data writing. In step 2217, the block-VHD converter 1601 expands the VHD File by using the functionality of the file system 1602. In step 2218, the block-VHD converter 1601 writes data to the VLBA calculated in step 2013. In step 2219, the block-VHD converter 1601 returns the result. In step 2205, the data access module 254 writes data by some other method. In step 2206, the data access module 254 returns the result.

Figure 23:
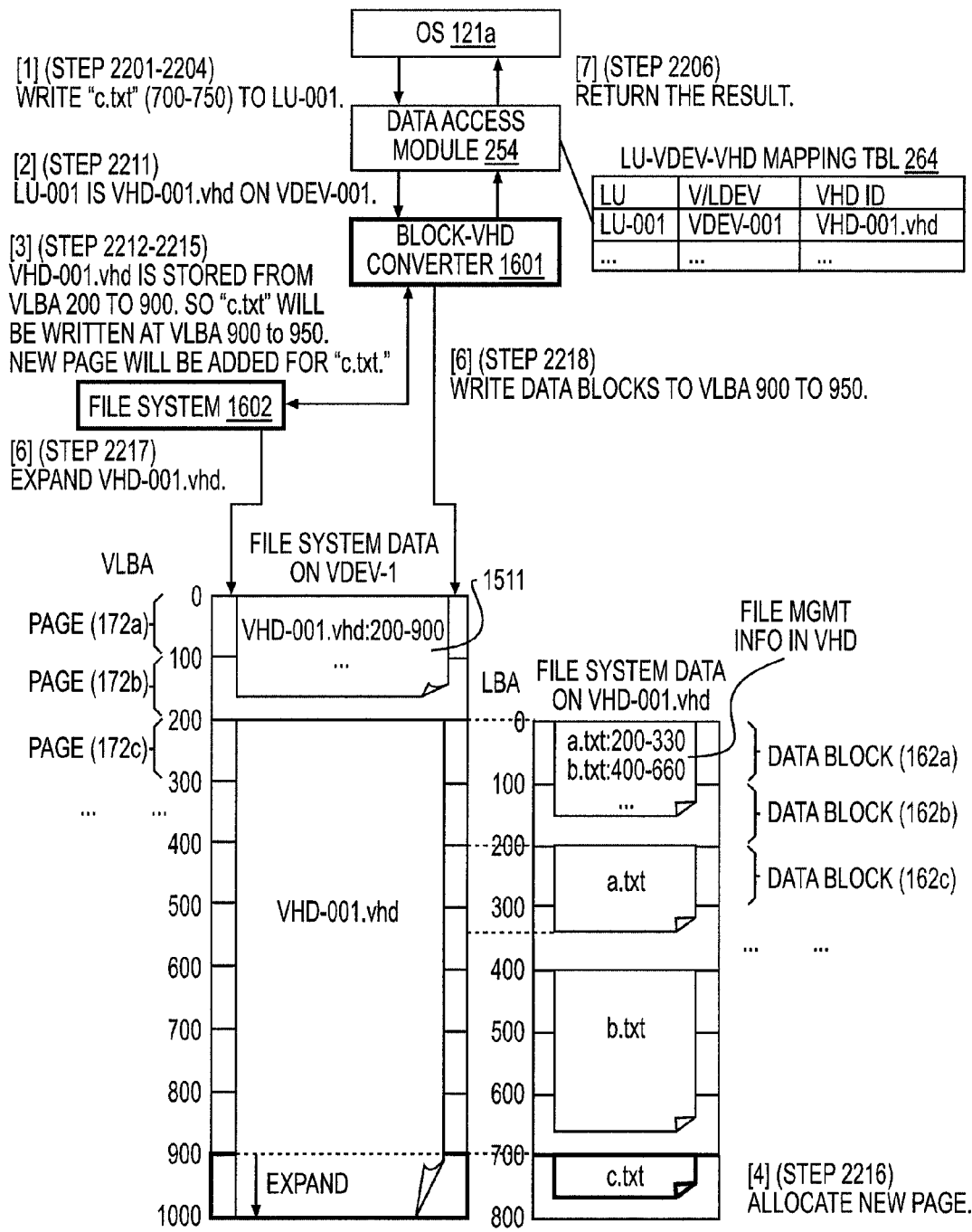
FIG. 23 shows an example of a process flow and a data structure for writing data to the VHD File by the host computer.

FIG. 23 shows an example of a process flow and a data structure for writing data to the VHD File 113 by the host computer 102. It is assumed that the data structure is the same as that in FIG. 21. [1] The data access module 254 receives a data write command that says "Write data to the LBA from 700 to 750 ("c.txt") of LU-001" (steps 2201 to 2204). [2] The data access module 254 finds that LU-001 is assigned to VHD-001.vhd on VDEV-001 (step 2211). [3] The block-VHD converter 1601 finds that VHD-001.vhd is stored at VLBA 200 to 900, and also finds that LBA 700 to 750 ("c.txt") should be stored to the VLBA from 900 to 950 (steps 2212 to 2215). However, the page for the VLBA from 900 to 950 has not been allocated yet. [4] A new page is allocated (step 2216). [5] The file system 1602 expands the VHD-001.vhd (step 2217). [6] The file system 1602 writes data blocks to the VLBA from 900 to 950 (step 2218). [7] The file system 1602 returns the result as successful data write (step 2206).

Specific embodiments of this invention are used for the purpose of deployment of virtual hard disk to virtual volume so that the virtual hard disk can be accessed by the physical host computer through a fiber channel interface. The embodiments can be implemented in a storage management software or in a storage management micro program in the storage sub system (storage apparatus). Embodiments of the invention provide a solution to deploy VHD to virtual device with maximizing capacity efficiency and data access performance by making the allocation unit size of virtual device the same as that of the VHD. A stand alone storage apparatus can expose the data access interface of virtual hard disk to host computer.

Of course, the system configurations illustrated in FIGS. 1-3 and 15-17 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network.

Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for deploying a virtual hard disk file to a virtual volume known as thin provisioning. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system of deploying a VHD (virtual hard disk) file to a storage apparatus, the system comprising:
a storage apparatus;
a host computer; and
a network connecting the storage apparatus and the host computer;
wherein the storage apparatus receives a VHD file and checks a block size of the VHD file based on a header of the VHD file; creates a virtual volume to provide a page size which is same size as the block size of the VHD file; and performs one of
(A) copying contents of the VHD file to the created virtual volume by allocating one page of the created virtual volume for each block of the VHD file; or
(B) formatting the created virtual volume with a virtual volume file system, and copying the VHD file to the formatted virtual volume; and
wherein the storage apparatus includes a LU-volume-VHD mapping table which contains mapping information for at least one of mapping one or more virtual volumes in the storage apparatus each to a logical unit presented by the storage apparatus to the host computer so as to accept access from the host computer to the virtual volume, or mapping one or more logical devices in the storage apparatus each to a logical unit presented by the storage apparatus to the host computer so as to accept access from the host computer to the logical device, wherein LU stands for logical unit.

2. A system according to claim 1,
wherein the created virtual volume and the VHD file have same capacity.

3. A system according to claim 1, further comprising:
a management computer connected to the network;
wherein the storage apparatus includes a VHD management module which receives the VHD file from the management computer, creates the virtual volume, and sends back to the management computer an ID (identification) of a logical unit in the storage apparatus corresponding to the VHD file, the logical unit being presented by the storage apparatus to the host computer so as to accept access from the host computer to the virtual volume.

4. A system according to claim 1,
wherein the storage apparatus performs (A) to copy contents of the VHD file to the virtual volume; and
wherein the storage apparatus includes a volume controller and a VHD-block converter which reads a VHD size and a block size of the VHD file from the header of the VHD file, and invokes the volume controller to create the virtual volume to provide a page size which is the same size as the block size of the VHD file and a virtual volume size which is same size as the VHD size of the VHD file.

5. A system according to claim 4,
wherein the VHD-block converter assigns a logical unit ID of a logical unit to the virtual volume and adds one entry of record into a LU-volume-VHD mapping table which contains mapping information for mapping the virtual volume to the logical unit presented by the storage apparatus to the host computer so as to accept access from the host computer to the virtual volume, the entry of record including the logical unit ID, a VHD ID of the VHD file, and a volume ID identifying the virtual volume in the storage apparatus.

6. A system according to claim 1,
wherein the storage apparatus performs (B) to copy the VHD file to the formatted virtual volume;
wherein the storage apparatus receives a data write command to write data to a logical unit corresponding to the VHD file copied to the formatted virtual volume; and
wherein the storage apparatus provides a dynamic conversion between the VHD file and the logical unit, on an on-demand basis, by allocating one or more pages in the formatted virtual volume for writing data from the write command on an on-demand basis.

7. A system according to claim 1,
wherein the storage apparatus performs (B) to copy the VHD file to the formatted virtual volume; and
wherein the storage apparatus includes a volume controller and a VHD deployment module which receives the VHD file, obtains a VHD size and the block size of the VHD file, and invokes the volume controller to create the virtual volume to provide a page size which is the same size as the block size of the VHD file and a virtual volume size which is same size as the VHD size of the VHD file.

8. A system according to claim 7,
wherein the storage apparatus includes a file system which formats the virtual volume;
wherein the VHD deployment module writes the header and all data blocks of the VHD file to the formatted virtual volume, and assigns a logical unit ID of a logical unit to the virtual volume and adding one entry of record into a LU-volume-VHD mapping table which contains mapping information for mapping the virtual volume to the logical unit presented by the storage apparatus to the host computer so as to accept access from the host computer to the virtual volume, the entry of record including the logical unit ID, a VHD ID of the VHD file, and a volume ID identifying the virtual volume in the storage apparatus.

9. A system according to claim 8,
wherein the storage apparatus includes a block-VHD converter which receives a read command from the host computer, the read command including a target logical unit ID, a target LBA (logical block address), and a size;
wherein if the target logical unit ID in the LU-volume-VHD mapping table indicates a VHD file to be read, the block-VHD converter obtains a volume ID of the virtual volume corresponding to the target logical unit ID and a VHD ID corresponding to the volume ID, gets a start VLBA of the VHD file specified by the VHD ID and volume ID, calculates a VLBA (virtual logical block address) by using the target LBA and the start VLBA, and reads data from the calculated VLBA.

10. A method of deploying a VHD (virtual hard disk) file to a storage apparatus, the method comprising:
checking a block size of the VHD file received by the storage apparatus based on a header of the VHD file;
creating a virtual volume to provide a page size which is same size as the block size of the VHD file;
performing one of
(A) copying contents of the VHD file to the created virtual volume by allocating one page of the created virtual volume for each block of the VHD file; or
(B) formatting the created virtual volume with a virtual volume file system, and copying the VHD file to the formatted virtual volume; and
providing a LU-volume-VHD mapping table in the storage apparatus, the LU-volume-VHD mapping table containing mapping information for at least one of mapping one or more virtual volumes in the storage apparatus and a VHD each to a logical unit presented by the storage apparatus to a host computer so as to accept access from the host computer to the virtual volume, or mapping one or more logical devices in the storage apparatus and a VHD each to a logical unit presented by the storage apparatus to a host computer so as to accept access from the host computer to the logical device, wherein LU stands for logical unit.

11. A method according to claim 10,
wherein the created virtual volume and the VHD file have same capacity.

12. A method according to claim 10, further comprising:
assigning a logical unit ID (identification) of the logical unit corresponding to the virtual volume and adding one entry of record into a LU-volume-VHD mapping table which contains mapping information for mapping the virtual volume to the logical unit presented by the storage apparatus to the host computer so as to accept access from the host computer to the virtual volume, the entry of record including the logical unit ID, a VHD ID of the VHD file, and a volume ID identifying the virtual volume in the storage apparatus.

13. A method according to claim 1, wherein (B) is performed to copy the VHD file to the formatted virtual volume, the method further comprising:
receiving a data write command to write data to a logical unit corresponding to the VHD file copied to the formatted virtual volume; and
providing a dynamic conversion between the VHD file and the logical unit, on an on-demand basis, by allocating one or more pages in the formatted virtual volume for writing data from the write command on an on-demand basis.

14. A computer-readable storage medium storing a plurality of instructions for controlling a data processor to deploy a VHD (virtual hard disk) file to a storage apparatus, the plurality of instructions comprising:
instructions that cause the data processor to check a block size of the VHD file received by the storage apparatus based on a header of the VHD file;
instructions that cause the data processor to create a virtual volume to provide a page size which is same size as the block size of the VHD file;
instructions that cause the data processor to perform one of
(A) copying contents of the VHD file to the created virtual volume by allocating one page of the created virtual volume for each block of the VHD file; or
(B) formatting the created virtual volume with a virtual volume file system, and copying the VHD file to the formatted virtual volume;
instructions that cause the data processor to provide a LU-volume-VHD mapping table in the storage apparatus, the LU-volume-VHD mapping table containing mapping information for at least one of mapping one or more virtual volumes in the storage apparatus each to a logical unit presented by the storage apparatus to a host computer so as to accept access from the host computer to the virtual volume, or mapping one or more logical devices in the storage apparatus each to a logical unit presented by the storage apparatus to a host computer so as to accept access from the host computer to the logical device, where LU stands for logical unit.

15. A computer-readable storage medium according to claim 14,
wherein the created virtual volume and the VHD file have same capacity.

16. A computer-readable storage medium according to claim 14, wherein the plurality of instructions further comprise:
instructions that cause the data processor to assign a logical unit ID (identification) of the logical unit corresponding to the virtual volume and adding one entry of record into a LU-volume-VHD mapping table which contains mapping information for mapping the virtual volume to the logical unit presented by the storage apparatus to the host computer so as to accept access from the host computer to the virtual volume, the entry of record including the logical unit ID, a VHD ID of the VHD file, and a volume ID identifying the virtual volume in the storage apparatus.

17. A computer-readable storage medium according to claim 14, wherein (B) is performed to copy the VHD file to the formatted virtual volume, and wherein the plurality of instructions further comprise:
  instructions that cause the data processor to receive a data write command to write data to a logical unit corresponding to the VHD file copied to the formatted virtual volume; and
  instructions that cause the data processor to provide a dynamic conversion between the VHD file and the logical unit, on an on-demand basis, by allocating one or more pages in the formatted virtual volume for writing data from the write command on an on-demand basis.

18. A computer-readable storage medium according to claim 14, wherein the plurality of instructions further comprise:
  instructions that cause the data processor to receive the VHD file from a management computer, create the virtual volume, and send back to the management computer an ID (identification) of a logical unit in the storage apparatus corresponding to the VHD file; and
  instructions that cause the data processor to present the logical unit to the host computer so as to accept access from the host computer to the virtual volume in the storage apparatus.

19. A computer-readable storage medium according to claim 14, wherein (A) is performed to copy contents of the VHD file to the virtual volume, and wherein the plurality of instructions further comprise:
  instructions that cause the data processor to read a VHD size and a block size of the VHD file from the header of the VHD file, and create the virtual volume to provide a page size which is the same size as the block size of the VHD file and a virtual volume size which is same size as the VHD size of the VHD file.

20. A computer-readable storage medium according to claim 14, wherein (B) is performed to copy the VHD file to the formatted virtual volume, and wherein the plurality of instructions further comprise:
  instructions that cause the data processor to read a VHD size and a block size of the VHD file from the header of the VHD file, and create the virtual volume to provide a page size which is the same size as the block size of the VHD file and a virtual volume size which is same size as the VHD size of the VHD file.

* * * * *